United States Patent
Zhang et al.

(10) Patent No.: US 11,497,052 B1
(45) Date of Patent: Nov. 8, 2022

(54) FULL DUPLEX RANDOM ACCESS OCCASION CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US); Sony Akkarakaran, Poway, CA (US); Jelena Damnjanovic, Del Mar, CA (US); Tianyang Bai, Somerville, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/319,953

(22) Filed: May 13, 2021

(51) Int. Cl.
*H04W 74/00* (2009.01)
*H04W 74/08* (2009.01)
*H04W 72/04* (2009.01)
*H04W 72/12* (2009.01)
*H04W 56/00* (2009.01)

(52) U.S. Cl.
CPC ....... *H04W 74/008* (2013.01); *H04W 56/001* (2013.01); *H04W 72/046* (2013.01); *H04W 72/0473* (2013.01); *H04W 72/1263* (2013.01); *H04W 74/0841* (2013.01)

(58) Field of Classification Search
CPC ........... H04W 74/008; H04W 74/0841; H04W 74/0833; H04W 56/001; H04W 72/046; H04W 72/0473; H04W 72/1263; H04W 72/00; H04B 7/0695; H04B 7/088; H04B 7/0617; H04L 5/0053; H04L 5/0048; H04L 5/0051
See application file for complete search history.

(56) References Cited

U.S. PATENT DOCUMENTS

2021/0136827 A1\* 5/2021 Xiong .................. H04L 5/0044

FOREIGN PATENT DOCUMENTS

WO WO-2021144352 A1 \* 7/2021

\* cited by examiner

*Primary Examiner* — Ricardo H Castaneyra
(74) *Attorney, Agent, or Firm* — Yanling Yang

(57) ABSTRACT

Methods, systems, and devices for wireless communications are described. In some examples, a random access occasion may overlap in time with a synchronization signal block resource, where the random access occasion and the synchronization signal block resource have a same index. In some such examples, a base station may transmit, to a user equipment (UE), an indicator of a mapping of the random access occasion to an uplink beam that is associated with a synchronization signal block resource with a different index than the random access occasion. The UE may transmit, to the base station, a random access preamble over the random access occasion using the uplink beam.

30 Claims, 17 Drawing Sheets

US 11,497,052 B1

FULL DUPLEX RANDOM ACCESS OCCASION CONFIGURATION

FIELD OF TECHNOLOGY

The following relates to wireless communications, including full duplex random access occasion configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate in a full-duplex mode, in which the UE is capable of receiving and transmitting simultaneously, or a half-duplex mode, in which the UE is capable of receiving or transmitting at a given time. Operating in a full-duplex mode may present challenges.

SUMMARY

The described techniques relate to improved methods, systems, devices, and apparatuses that support full duplex random access occasion configuration. Generally, the described techniques provide for a user equipment (UE) and/or a base station to reduce interference between a synchronization signal block (SSB) resource and a random access preamble. For instance, a random access occasion may overlap in time with a synchronization signal block resource, where the random access occasion and the synchronization signal block resource have a same index. In some such examples, a base station may transmit, to a user equipment (UE), an indicator of a mapping of the random access occasion to an uplink beam that is associated with a synchronization signal block resource with a different index than the random access occasion. The UE may transmit, to the base station, a random access preamble over the random access occasion using the uplink beam.

A method for wireless communication at a user equipment (UE) is described. The method may include receiving, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and transmitting, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

An apparatus for wireless communication at a UE is described. The apparatus may include a processor, memory coupled with the processor, and instructions stored in the memory. The instructions may be executable by the processor to cause the apparatus to receive, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and transmit, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

Another apparatus for wireless communication at a UE is described. The apparatus may include means for receiving, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and means for transmitting, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

A non-transitory computer-readable medium storing code for wireless communication at a UE is described. The code may include instructions executable by a processor to receive, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and transmit, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

In some examples of the method, apparatuses, and non-transitory computer-readable medium described herein, receiving the indicator may include operations, features, means, or instructions for receiving an offset of the set of uplink beams associated with the set of random access occasions and relative to the set of downlink beams associated with the set of synchronization signal block resources, where a first index associated with the first uplink beam may be based on the random access occasion and the offset, and where transmitting the random access preamble using the first uplink beam may be based on receiving the offset.

In some examples of the method, apparatuses, and non-transitory computer-readable medium described herein, receiving the indicator may include operations, features, means, or instructions for receiving a set of indices for the set of random access occasions, where a first index of the set of indices indicates a correspondence between the random access occasion and the first uplink beam of the set of uplink beams, where transmitting the random access preamble using the first uplink beam may be based on receiving the set of indices.

In some examples of the method, apparatuses, and non-transitory computer-readable medium described herein, receiving the indicator may include operations, features, means, or instructions for receiving an index that indicates a mapping pattern configured at the UE, where the mapping pattern indicates a correspondence between the set of random access occasions and the set of uplink beams, and where transmitting the random access preamble using the first uplink beam may be based on receiving the index.

Some examples of the method, apparatuses, and non-transitory computer-readable medium described herein may further include operations, features, means, or instructions for receiving, from the base station, an indication of a set of mapping patterns, where each mapping pattern of the set indicates the respective uplink beam for each random access occasion of the set of random access occasions where transmitting the random access preamble using the first uplink beam may be based on receiving the indication of the set of mapping patterns.

Some examples of the method, apparatuses, and non-transitory computer-readable medium described herein may further include operations, features, means, or instructions for receiving one or more parameters indicating a set of transmit power offsets for the set of random access occasions, where transmitting the random access preamble may be based on a respective transmit power associated with the random access occasion.

Some examples of the method, apparatuses, and non-transitory computer-readable medium described herein may further include operations, features, means, or instructions for receiving, in a full-duplex mode with transmitting the random access preamble using the first uplink beam, a synchronization signal block via the first downlink beam, where transmitting the random access preamble over the random access occasion using the first uplink beam may be based on a correspondence between the random access occasion and the first uplink beam.

Some examples of the method, apparatuses, and non-transitory computer-readable medium described herein may further include operations, features, means, or instructions for selecting the random access occasion from the set of random access occasions based on a reference signal received power associated with the first uplink beam satisfying a threshold.

In some examples of the method, apparatuses, and non-transitory computer-readable medium described herein, the first uplink beam associated with the random access occasion corresponds to a full-duplex mode of the UE and a second uplink beam associated with a second random access occasion corresponds to a half-duplex mode of the UE, the full-duplex mode may be associated with reception of one or more synchronization signal blocks that overlap in time with transmission of the random access preamble, and the random access occasion and the second random access occasion may be associated with a same uplink beam based on the first uplink beam corresponding to the full-duplex mode and the second uplink beam corresponding to the half-duplex mode.

In some examples of the method, apparatuses, and non-transitory computer-readable medium described herein, the indicator may be conveyed via remaining minimum system information signaling.

In some examples of the method, apparatuses, and non-transitory computer-readable medium described herein, the random access occasion at least partially overlaps in time with a respective synchronization signal block associated with the random access occasion for the mapping.

A method for wireless communication at a base station is described. The method may include transmitting, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and receiving, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

An apparatus for wireless communication at a base station is described. The apparatus may include a processor, memory coupled with the processor, and instructions stored in the memory. The instructions may be executable by the processor to cause the apparatus to transmit, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and receive, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

Another apparatus for wireless communication at a base station is described. The apparatus may include means for transmitting, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and means for receiving, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

A non-transitory computer-readable medium storing code for wireless communication at a base station is described. The code may include instructions executable by a processor to transmit, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources and receive, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

In some examples of the method, apparatuses, and non-transitory computer-readable medium described herein, transmitting the indicator may include operations, features, means, or instructions for transmitting an offset of the set of uplink beams associated with the set of random access occasions and relative to the set of downlink beams associated with the set of synchronization signal block resources, where a first index associated with the first uplink beam may be equal to a second index associated with the random access occasion combined with the offset, and where receiving the random access preamble transmitted via the first uplink beam may be based on transmitting the offset.

In some examples of the method, apparatuses, and non-transitory computer-readable medium described herein, transmitting the indicator may include operations, features, means, or instructions for transmitting an index for each random access occasion indicating a correspondence between the random access occasion and a respective uplink beam of the set of uplink beams, where receiving the random access preamble transmitted via the first uplink beam may be based on transmitting the index for each random access occasion.

In some examples of the method, apparatuses, and non-transitory computer-readable medium described herein, transmitting the indicator may include operations, features, means, or instructions for transmitting a set of indices for the set of random access occasions, where a first index of the set of indices indicates a correspondence between the random access occasion and the first uplink beam of the set of uplink beams, where receiving the random access preamble transmitted via the first uplink beam may be based on transmitting the set of indices.

Some examples of the method, apparatuses, and non-transitory computer-readable medium described herein may further include operations, features, means, or instructions for transmitting, to the UE, an index that indicates a mapping pattern configured at the UE, where the mapping pattern indicates a correspondence between the set of random access occasions and the set of uplink beams, and where receiving the random access preamble transmitted via the first uplink beam may be based on transmitting the index.

Some examples of the method, apparatuses, and non-transitory computer-readable medium described herein may further include operations, features, means, or instructions for transmitting one or more parameters indicating a set of transmit power offsets for the set of random access occasions, where receiving the random access preamble may be based on a respective transmit power associated with the random access occasion.

Some examples of the method, apparatuses, and non-transitory computer-readable medium described herein may further include operations, features, means, or instructions for transmitting, to a second UE, a synchronization signal block over the first synchronization signal block resource, where receiving the random access preamble transmitted via the first uplink beam may be based on transmitting the synchronization signal block over the first synchronization signal block resource.

Some examples of the method, apparatuses, and non-transitory computer-readable medium described herein may further include operations, features, means, or instructions for transmitting, to the UE in a full-duplex mode with receiving the random access preamble transmitted via the first uplink beam, a synchronization signal block received via the first downlink beam, where receiving the random access preamble over the random access occasion and transmitted via the first uplink beam may be based on a correspondence between the random access occasion and the first uplink beam.

In some examples of the method, apparatuses, and non-transitory computer-readable medium described herein, the first uplink beam of the random access occasion corresponds to a full-duplex mode of the UE and a second uplink beam of a second random access occasion corresponds to a half-duplex mode of the UE, the full-duplex mode may be associated with reception of one or more synchronization signal blocks that overlap in time with transmission of the random access preamble, and the random access occasion and the second random access occasion may be associated with a same uplink beam based on the first uplink beam corresponding to the full-duplex mode and the second uplink beam corresponding to the half-duplex mode.

In some examples of the method, apparatuses, and non-transitory computer-readable medium described herein, the indicator may be conveyed via remaining minimum system information signaling.

In some examples of the method, apparatuses, and non-transitory computer-readable medium described herein, the random access occasion at least partially overlaps in time with a respective synchronization signal block associated with the random access occasion in the mapping.

DETAILED DESCRIPTION

Figure 1:
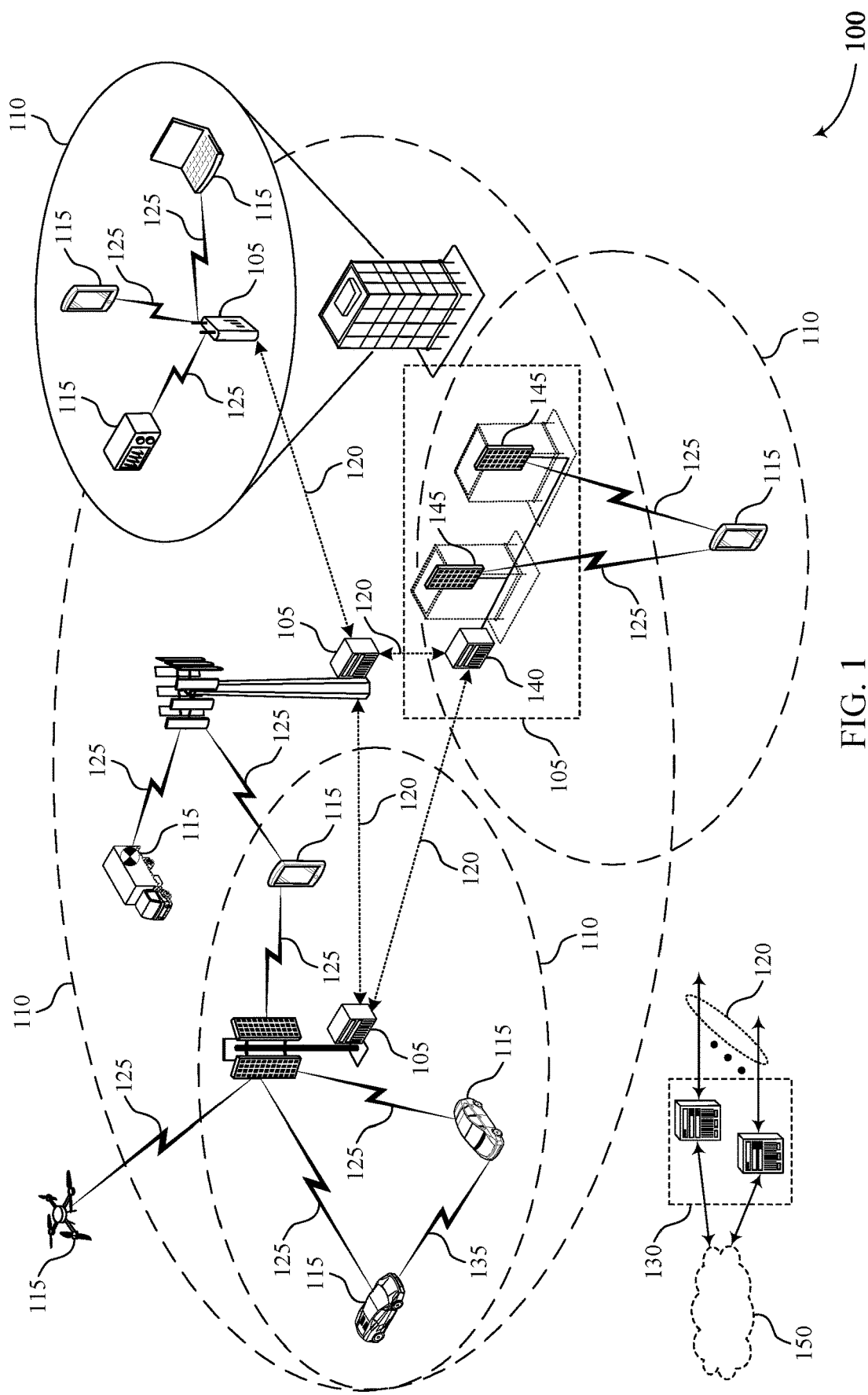
FIG. 1 illustrates an example of a wireless communications system that supports full duplex random access occasion configuration in accordance with aspects of the present disclosure.

In some examples, a base station and a user equipment (UE) may have a full-duplex capability or a half-duplex capability. UEs and base stations with a full-duplex capability may be capable of transmitting and receiving simultaneously, whereas UEs and base stations with a half-duplex capability may be capable of transmitting or receiving at a given instance of time. In some examples, the base station and the UE may identify resources for communicating a random access channel (RACH) preamble (e.g., a random access occasion, which may also be referred to as a RACH occasion (RO)) and a synchronization signal block (SSB) (e.g., an SSB resource). If the UE and the base station operate in a half-duplex mode, the RO may not overlap in time with the SSB resource. However, if the UE or the base station operate in the full-duplex mode, the RO may overlap in time with the SSB resource.

In some examples in which an RO and an SSB resource overlap in time, the RO and the SSB resource may each be associated with a same index. For instance, a first RO (e.g., RO1) may overlap in time with a first SSB (e.g., SSB1), a second RO (e.g., RO2) may overlap in time with a second SSB (e.g., SSB2) and so on. ROs and SSBs that share the same index may be associated with reciprocal beams. For instance, the beam that the UE uses to receive the SSB may be the same as the beam that the UE uses to transmit the RACH preamble. Similarly, the beam that the base station uses to transmit the SSB may be the same as the beam that the base station uses to receive the RACH preamble. Accordingly, interference between the RACH preamble and the SSB may occur. Interference may decrease the efficiency of communications.

The methods of the present disclosure describe techniques that may enable a UE and a base station to reduce or mitigate interference between an SSB and a RACH preamble when an SSB resource overlaps with an RO in time. For instance, the base station may transmit, to the UE, an indicator of a mapping from a set of ROs to a set of uplink beams. Each uplink beam of the set of uplink beams may be associated with a downlink beam whose SSB resource has a different index than the SSB resource that is overlapping in time with the RO. Accordingly, the beam that the UE uses to transmit a RACH preamble may not be reciprocal with the beam that the UE uses to receive an SSB. Similarly, the beam that the base station uses to receive a RACH preamble may not be reciprocal with the beam that the base station uses to transmit an SSB. Accordingly, interference between the RACH preamble and the SSB may be reduced or mitigated.

Aspects of the disclosure are initially described in the context of wireless communications systems. Additional aspects of the disclosure are described in the context of full-duplex configurations and a process flow. Aspects of the disclosure are further illustrated by and described with reference to apparatus diagrams, system diagrams, and flowcharts that relate to full duplex random access occasion configuration.

FIG. 1 illustrates an example of a wireless communications system 100 that supports full duplex random access occasion configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 and a UE 115 may have a full-duplex capability or a half-duplex capability. UEs 115 and base stations 105 with a full-duplex capability may be capable of transmitting and receiving simultaneously, whereas UEs 115 and base stations 105 with a half-duplex capability may be capable of transmitting or receiving at a given instance of time. In some examples, the base station 105 and the UE 115 may identify resources for communicating a RACH preamble (e.g., an RO) and an SSB (e.g., an SSB resource). If the UE 115 and the base station 105 operate in a half-duplex mode, the RO may not overlap in time with the SSB resource. However, if the UE 115 or the base station 105 operate in the full-duplex mode, the RO may overlap in time with the SSB resource.

In some examples in which an RO and an SSB resource overlap in time, the RO and the SSB resource may each be associated with a same index. For instance, a first RO (e.g., RO1) may map to a first SSB (e.g., SSB1), a second RO (e.g., RO2) may map to a second SSB (e.g., SSB2) and so on. ROs and SSBs that share the same index may be associated with reciprocal beams. For instance, the beam that the UE 115 uses to receive the SSB may be the same as the beam that the UE 115 uses to transmit the RACH preamble. Similarly, the beam that the base station 105 uses to transmit the SSB may be the same as the beam that the base station 105 uses to receive the RACH preamble. Accordingly, interference between the RACH preamble and the SSB may occur. Interference may decrease the efficiency of communications.

The methods of the present disclosure describe techniques that may enable a UE 115 and a base station 105 to reduce or mitigate interference between an SSB and a RACH preamble when an SSB resource overlaps with an RO in time. For instance, the base station 105 may transmit, to the UE 115, an indicator of a mapping from a set of ROs to a set of uplink beams. Each uplink beam of the set of uplink beams may be associated with a downlink beam whose SSB resource has a different index than the SSB resource that is overlapping in time with the RO. Accordingly, the beam that the UE 115 uses to transmit a RACH preamble may not be reciprocal with the beam that the UE 115 uses to receive an SSB. Similarly, the beam that the base station 105 uses to receive a RACH preamble may not be reciprocal with the beam that the base station 105 uses to transmit an SSB. Accordingly, interference between the RACH preamble and the SSB may be reduced or mitigated.

Figure 2A:
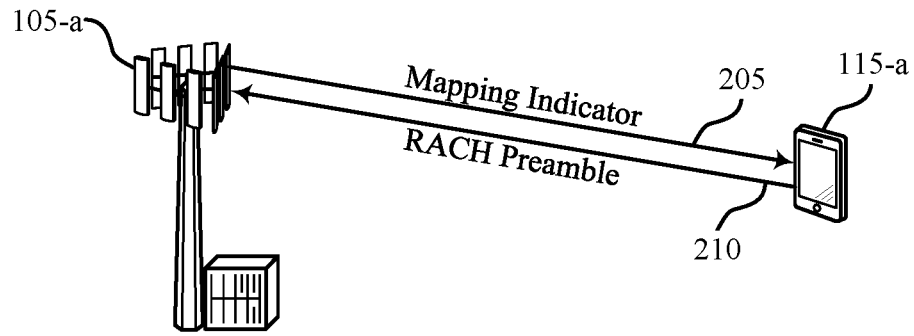
FIGS. 2A and 2B illustrate examples of wireless communications systems that support full duplex random access occasion configuration in accordance with aspects of the present disclosure.
Figure 2B:
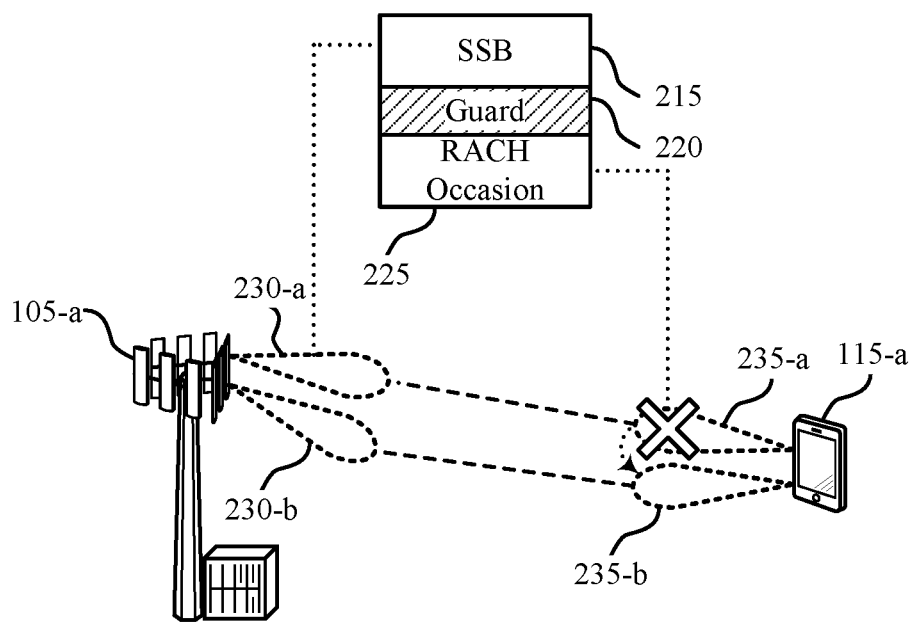

FIGS. 2A and 2B illustrate examples of wireless communications systems 200-a and 200-b that support full duplex random access occasion configuration in accordance with aspects of the present disclosure. In some examples, wireless communications systems 200-a and 200-b may implement one or more aspects of wireless communications system 100. For instance, base station 105-a may be an example of a base station 105 as described with reference to FIG. 1 and UE 115-a may be an example of a UE 115 as described with reference to FIG. 1.

In some examples, base station 105-a, UE 115-a, or both may have a full-duplex capability (e.g., may operate in a full-duplex mode). For instance, in some examples (e.g., as described with reference to FIGS. 3A and 3C), UE 115-a may use a first panel for transmitting one or more uplink transmissions and may use a second panel for receiving one or more downlink transmissions. Additionally, or alternatively (e.g., as described with reference to FIGS. 3B and 3C), base station 105-a may use a first panel for receiving one or more uplink transmissions and may use a second panel for transmitting one or more downlink transmissions. In some examples, the full-duplex capability may be conditional according to one or more conditions (e.g., beam interference, self-interference between downlink and uplink, clutter echo). In some examples, operating in a full-duplex mode may be associated with one or more advantages. For instance, latency associated with communications may be reduced (e.g., due to being able to receive downlink signals in uplink only slots), thus enabling latency savings. Additionally, spectrum efficiency (per cell, per UE 115) may be increased and/or enhanced and resources may be used more efficiently (e.g., as a resource may carry both uplink and downlink transmissions).

In some examples, UEs 115 and base stations 105 that do not have a full-duplex capability may have a half-duplex capability in which they may operate in a half-duplex mode. Additionally, UEs 115 and base stations 105 that do have a full-duplex capability may be capable of operating in a half-duplex mode. Operating in a half-duplex mode may include selecting to transmit or to receive over a time duration for a given frequency range (e.g., bandwidth, carrier, subcarrier, bandwidth part) but not both.

In some examples, base station 105-a and UE 115-a may identify resources for communicating a RACH preamble (e.g., an RO) and an SSB (e.g., for a given carrier). If UE 115-a or base station 105-a operate in a half-duplex mode, the RO may not overlap in time with downlink transmissions (e.g., an SSB, a physical downlink control channel (PDCCH) transmission, a physical downlink shared channel (PDSCH) transmission, a channel state information (CSI) reference signal (CSI-RS)). In such examples, the RO may be referred to as a time division multiplexed (TDMed) RO type.

However, if UE 115-a and base station 105-a are operating in a full-duplex mode, the RO may overlap in time with downlink transmissions (e.g., SSB, PDCCH, PDSCH, CSI-RS). In some examples, the RO and downlink transmissions may share the same time resources but at different or partially different frequency resources. For instance, in the present example, SSB resource 215 and RO 225 may overlap in time, but may be associated with different frequency resources. Such ROs may be referred to as a frequency division multiplexed (FDMed) RO type. In some examples, a guard band may be present between an RO and a downlink transmission. For instance, in the present example, SSB resource 215 and RO 225 may be separated by a guard band 220. In other example, ROs and downlink transmissions may share same time and frequency resources, in which case the RO may be an example of a spatial division multiplexed (SDMed) RO type. It should be noted that there may be examples in which the methods described herein may be applied to ROs that are of the FDMed RO type as well as the SDMed RO type. In some examples, more ROs of the FDMed RO type may be implemented over a given time duration than ROs of the TDMed RO type. Accordingly, latency for a RACH procedure may be reduced, on average, when ROs of the FDMed RO type are implemented (e.g., due to there being more opportunities for transmitting a RACH preamble).

In some examples, when an RO and downlink transmission overlap in time (e.g., SSB resource 215 and RO 225), the RO and the downlink transmission may be associated with a same index. For instance, in examples in which the downlink transmission is an SSB, an index of the synchronization signal (SS) and/or physical broadcast channel (PBCH) may be provided in a system information block (SIB), such as SIB1 (e.g., via an ssb-PositionsInBurst parameter) or may be provided by a parameter associated with a configuration common to multiple serving cells (e.g., ServingCellConfigCommon). Such indexes may be mapped to valid physical RACH (PRACH) occasions according to an order. For instance, the parameters may be described first in an increasing order of preamble indexes within a single PRACH occasion; second, in increasing order of frequency resource indexes for frequency multiplexed PRACH occasions; third in increasing order of time resources indexes for time multiplexed PRACH occasions within a PRACH slot; and fourth, in increasing order of indexes for PRACH slots. Accordingly, there may be examples in which, for instance, ROs associated with indexes 1 through 10 (e.g., RO1 through RO10) may map to SSB resources 1 through 10 in order (e.g., SSB1 through SSB10). ROs and SSB resources that map to a same index may be associated with reciprocal beams. For instance, the beam UE 115-a uses to receive an SSB associated with SSB1 may be the same as a beam that UE 115-a may use to transmit a RACH preamble over RO1. Similarly, the beam base station 105-a uses to transmit an SSB associated with SSB1 may be the same as a beam that base station 105-a may use to receive a RACH preamble over RO1. A beam being the same as another beam for a first and second transmission may include an antenna panel for communicating the first transmission (e.g., SSB) being the same as the antenna panel for communicating the second transmission (e.g., RACH preamble) or the antenna panel(s) (e.g., the same or different antenna panels) having the same coefficients (e.g., beam coefficients) for the first transmission and the second transmission.

In examples in which an SSB resource and an RO that share a same index do not overlap in time (e.g., the RO is a TDMed RO type), the corresponding SSB and RACH preamble may not interfere. However, if the SSB resource and the RO that share the same index do overlap in time (e.g., the RO is an FDMed RO type or an SDMed RO type), the SSB and the RACH preamble may interfere. Interference between transmissions may decrease the efficiency of communication between UE 115-a and base station 105-a.

The techniques described herein may enable UE 115-a to map the RO 225 to an uplink beam that is not reciprocal with a downlink beam for the SSB resource 215 that is overlapping the RO 225 in time. For instance, base station 105-a and UE 115-a may identify an SSB resource 215 and an RO 225 that overlap in time. Base station 105-*a* may be configured to transmit an SSB over SSB resource 215 via downlink beam 230-*a* and UE 115-*a* may be configured to transmit a RACH preamble 210 (e.g., which may also be referred to as a random access preamble) over uplink beam 235-*a*. In some examples, the SSB resource 215 associated with downlink beam 230-*a* and the RO 225 associated with uplink beam 235-*a* may be associated with a same index (e.g., SSB1 and RO1) and/or the associated beams may point along directly opposing directions. In some examples, base station 105-*a* may transmit, to UE 115-*a*, an indicator 205 of a mapping between a set of ROs (e.g., including RO 225) and a set of uplink beams. For instance, in the present example, the mapping may indicate that RO 225 is to be mapped to uplink beam 235-*b*, which may be associated with a downlink beam 230-*b* that has a different associated index than downlink beam 230-*a* (e.g., SSB6). UE 115-*a* may transmit the RACH preamble 210 over uplink beam 235-*b* to base station 105-*a*. It should be noted that the methods described herein may be performed when UE 115-*a* is operating in a full-duplex mode, base station 105-*a* is operating in a full-duplex mode, or both.

In some examples, the mapping may be conveyed via remaining minimum system information (RMSI). The mapping may provide one or more full-duplex SSB beam pairs and/or corresponding power offset values for SSB and/or RO full-duplex RACH. The ROs not configured with the mapping may be identified by UE 115-*a* and/or base station 105-*a* to be half-duplex ROs. Such half-duplex ROs may have a same index as an SSB beam. Additionally, the same SSB beam may map to different ROs. For instance, a same SSB beam may map to a half-duplex RO and a full-duplex RO (e.g., RO 225). UE 115-*a* may select an RO based on a threshold (e.g., a reference signal received power (RSRP) threshold). In some examples, beams being paired may include the beams being paired for a full-duplex operation of SSBs and ROs. For instance, a first downlink beam for the SSB resource 215 overlapping the RO 225 in time may be paired with a first uplink beam for the RO 225 (e.g., the uplink beam that RO 225 is mapped to according to the indicator 205).

In some examples, the mapping may be signaled according to one or more examples. In a first example, the indicator 205 may include an offset that UE 115-*a* may use to determine the mapping. For instance, if a set of ROs at UE 115-*a* includes RO1, RO2, and RO3, and the indicator 205 indicates an offset of 5, UE 115-*a* may map RO1, RO2, and RO3 to uplink beams that are associated with (e.g., complementary with) SSB6, SSB7, and SSB8, respectively (e.g., according to 1+5, 2+5, and 3+5, respectively).

In a second example, the indicator 205 may include a set of indices for the set of ROs, where each index of the set of indices maps a respective RO to a respective uplink beam. For instance, if there are three ROs in the set of ROs and the set of indices includes {6,7,10}, then RO1 may map to an uplink beam associated with (e.g., complementary with) SSB6, RO2 may map to an uplink beam associated with SSB7, and RO3 may map to an uplink beam associated with SSB10.

In a third example, the indicator 205 may include an index that indicates a mapping pattern (e.g., a mapping pattern index) configured at UE 115-*a*. For instance, in examples where the set of ROs includes three ROs, UE 115-*a* may be configured (e.g., configured by base station 105-*a*, another base station 105, or preconfigured) with a first mapping pattern of {6,7,10} and a second mapping pattern of {8,4,9}. If the indicator 205 indicates an index of 1, then RO1 may map to an uplink beam associated with (e.g., complementary with) SSB6, RO2 may map to an uplink beam associated with SSB7, and RO3 may map to an uplink beam associated with SSB10. However, if the indicator 205 indicates an index of 2, then RO1 may map to an uplink beam associated with SSB8, RO2 may map to an uplink beam associated with SSB4, and RO3 may map to an uplink beam associated with SSB9.

In some examples, the mapping may, additionally, or alternatively, indicate a RACH transmit power offset for each RO of the set of ROs. The RACH transmit power offset may be an offset relative to a transmit power for RACH preambles configured at UE 115-*a*. In some examples, the RACH transmit power offset may be indicated as a single offset for each RO. In other examples, the RACH transmit power may be indicated as a set of indices that correspond to respective RACH transmit power offsets. In other examples, the RACH transmit power may be indicated as a single index that indicates a RACH transmit power pattern configured at UE 115-*a*.

An example table depicting the mapping is illustrated below.

TABLE 1

| RO to SSB mapping | | | |
|---|---|---|---|
| Downlink | Uplink | RO/SSB mapping | Power Offset |
| SSB1 | RO1 | SSB6 | delta1 |
| SSB2 | RO2 | SSB7 | delta2 |
| SSB3 | RO3 | SSB10 | delta1 |
| ... | | | |
| ... | | | |
| SSB30 | RO30 | SSB1 | delta10 |
| SSB21 | (NO RO) | (NO RO) | (NO RO) |
| ... | | | |
| SSB64 | (NO RO) | (NO RO) | (NO RO) |

RO1, RO2, RO3, and RO30 may overlap in time with SSB1, SSB2, SSB3, and SSB30, respectively (e.g., these ROs may be associated with UE 115-*a* and/or base station 105-*a* operating in a full-duplex mode). SSB21 and SSB64 may not overlap in time with an RO (e.g., these SSB resources may be associated with UE 115-*a* and/or base station 105-*a* operating in a half-duplex mode). Additionally, there may be ROs that do not overlap in time with a respective SSB resource. RO1 may be mapped to an uplink beam associated with (e.g., complementary with) SSB6, RO2 may be mapped to an uplink beam associated with SSB7, RO3 may be mapped to an uplink beam associated with SSB10, and RO30 may be mapped to an uplink beam associated with SSB1. UE 115-*a* may use a first power offset delta1 when transmitting a RACH preamble associated with RO1 and RO3, a second power offset delta2 when transmitting a RACH preamble associated with RO2, and a third power offset delta10 when transmitting a RACH preamble associated with RO30.

In some examples, the methods described herein may be associated with one or more advantages. For instance, mapping the RO 225 to an uplink beam associated with a downlink beam whose SSB resource has a different index than the SSB resource 215 overlapping the RO 225 in time may enable UE 115-*a* to reduce interference between a RACH preamble transmitted over the RO 225 and an SSB transmitted over the SSB resource 215. Additionally, indicating the power offset for each RO may enable UE 115-*a* to adjust the RACH transmit power when mapping each RO to a respective uplink beam, which may, on average, increase the likelihood that base station 105-a receives and successfully decodes a RACH preamble from UE 115-a.

Figure 3A:
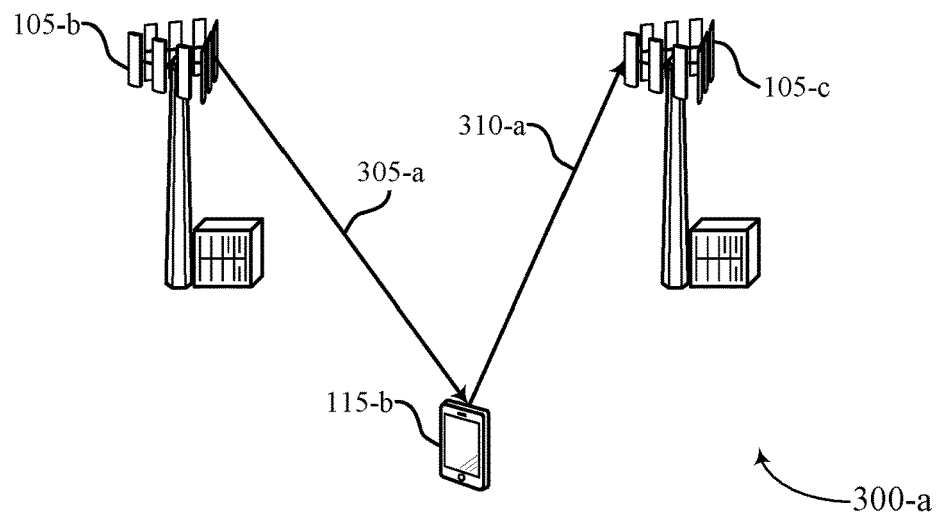
FIGS. 3A, 3B, and 3C illustrate examples of full-duplex configurations that support full duplex random access occasion configuration in accordance with aspects of the present disclosure.
Figure 3B:
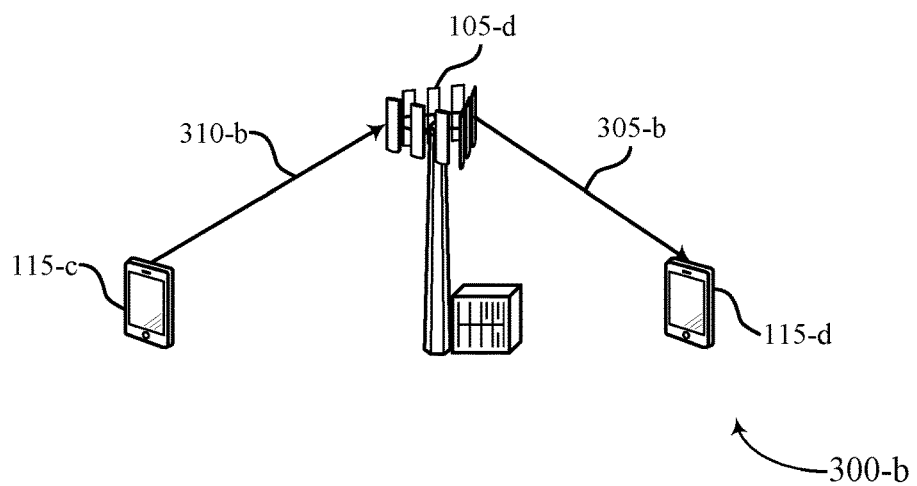
Figure 3C:
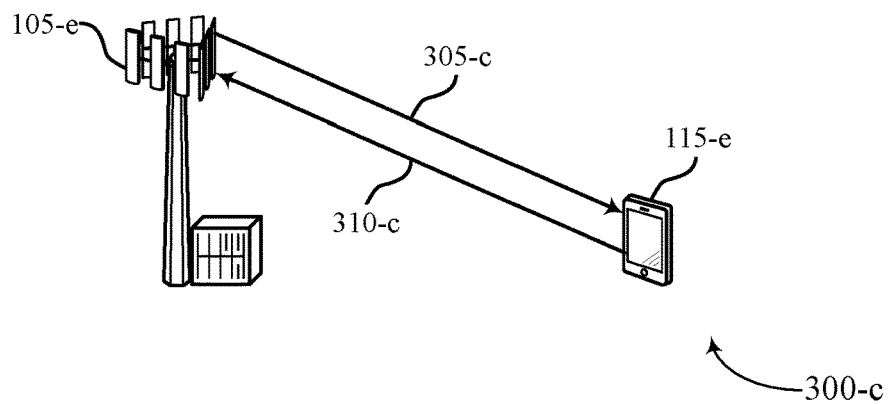

FIGS. 3A, 3B, and 3C illustrate examples of full-duplex configurations 300-a, 300-b, and 300-c that support full duplex random access occasion configuration in accordance with aspects of the present disclosure. In some examples, full-duplex configurations 300-a, 300-b, and 300-c may implement one or more aspects of wireless communications system 100. For instance, UEs 115-b, 115-c, 115-d, and 115-e may be examples of UEs 115 as described with reference to FIG. 1 and base stations 105-b, 105-c, 105-d, and 105-e may be examples of base stations 105 as described with reference to FIG. 1.

FIG. 3A may depict a full-duplex configuration 300-a in which a UE 115-b receives downlink transmissions via downlink 305-a from base station 105-b and transmits uplink transmissions to base station 105-c via uplink 310-a. In such examples, UE 115-b may be operating in a full-duplex mode. FIG. 3B may depict a full-duplex configuration 300-b in which a base station 105-d receives uplink transmissions via uplink 310-b from UE 115-c and transmits downlink transmissions to UE 115-d via downlink 305-b. In such examples, base station 105-d may be operating in a full-duplex mode. FIG. 3C may depict a full-duplex configuration 300-c in which base station 105-e receives uplink transmissions via uplink 310-c from UE 115-e and transmits downlink transmissions via downlink 305-c to UE 115-e. In such examples, UE 115-e and base station 105-e may each be operating in a full-duplex configuration.

In some examples, the methods described herein may be applied to one or more of the devices described with reference to FIGS. 3A, 3B, and 3C. For instance, base station 105-b may transmit, to UE 115-b an indicator (e.g., an indicator 205 as described with reference to FIG. 2) of a mapping of a set of ROs to a set of uplink beams and UE 115-b may transmit, to base station 105-c, a random access preamble over an RO of the set of ROs using a first uplink beam of the set of uplink beams based on the mapping. Similarly, base station 105-d may transmit, to UE 115-c, an indicator (e.g., an indicator 205 as described with reference to FIG. 2) of a mapping of a set of ROs to a set of uplink beams and UE 115-c may transmit, to base station 105-d, a random access preamble over an RO of the set of ROs using a first uplink beam of the set of uplink beams based on the mapping. Additionally, base station 105-e may transmit, to UE 115-e, an indicator (e.g., an indicator 205 as described with reference to FIG. 2) of a mapping of a set of ROs to a set of uplink beams and UE 115-e may transmit, to base station 105-e, a random access preamble over an RO of the set of ROs using a first uplink beam of the set of uplink beams based on the mapping.

Figure 4:
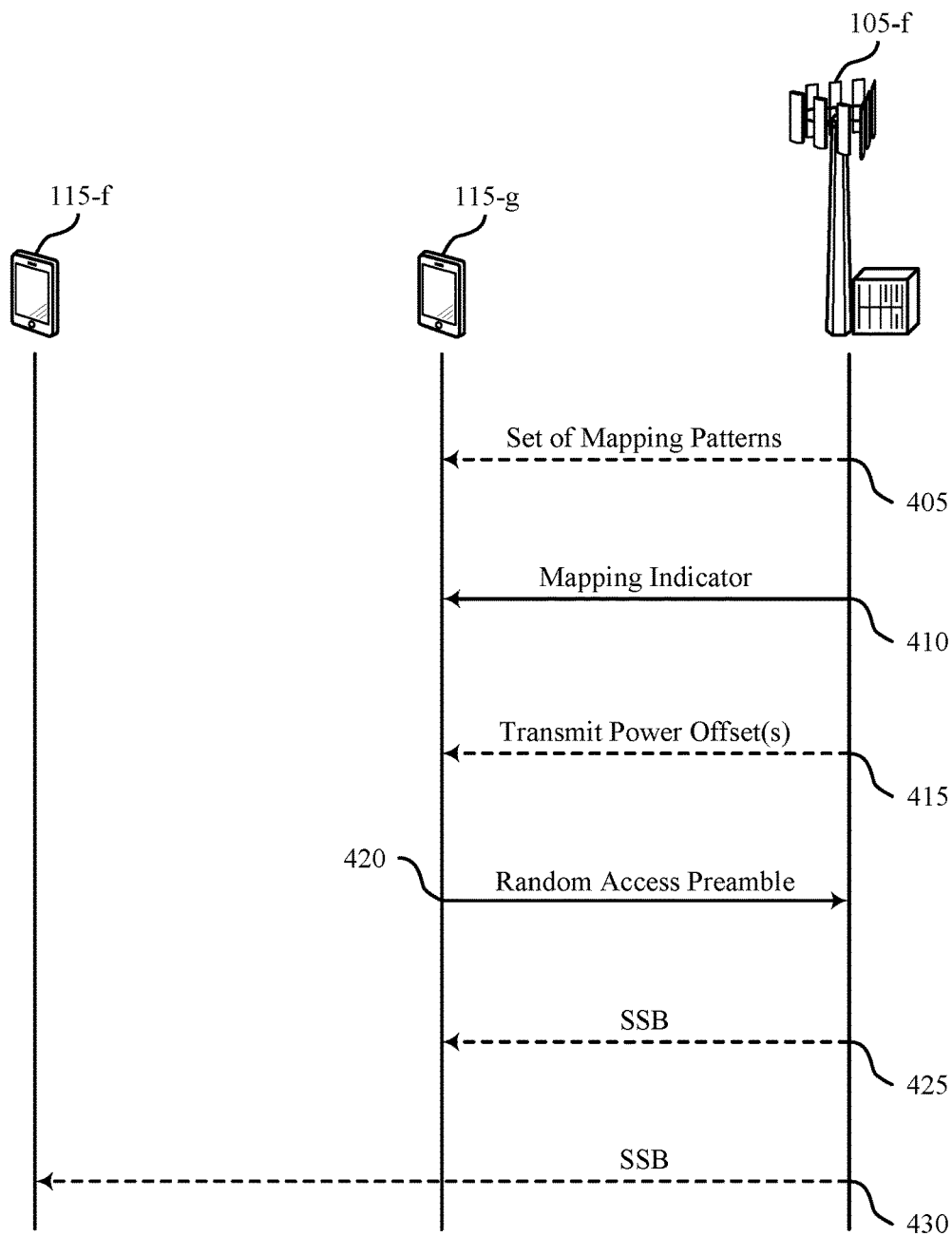
FIG. 4 illustrates an example of a process flow that supports full duplex random access occasion configuration in accordance with aspects of the present disclosure.

FIG. 4 illustrates an example of a process flow 400 that supports full duplex random access occasion configuration in accordance with aspects of the present disclosure. In some examples, process flow 400 may be implemented by one or more aspects of wireless communications system 100. For instance, UEs 115-f and 115-g may be examples of UEs 115 as described with reference to FIG. 1 and base station 105-f may be an example of a base station 105 as described with reference to FIG. 1.

At 405, base station 105-f may transmit, to UE 115-g, an indication of a set of mapping patterns (e.g., as described with reference to the third example of FIG. 2), where each mapping pattern of the set indicates a respective uplink beam for each RO of a set of ROs.

At 410, base station 105-f may transmit, to UE 115-g, an indicator of a mapping of the set of ROs to the set of uplink beams. In some examples, each uplink beam of the set of uplink beams may be paired with a respective downlink beam of a set of downlink beams. Additionally, each downlink beam of the set of downlink beams may be associated with a respective SSB resource of a set of SSB resources. In some examples (e.g., as described with reference to the first example of FIG. 2), receiving the indicator includes receiving an offset of the set of uplink beams associated with the set of ROs and relative to the set of downlink beams associated with the set of SSB resources. In some such examples, a first index associated with the first uplink beam is based on the RO and the offset. For instance, the first index may be equal to the index of the RO (e.g., 1 for RO1) combined with the offset (e.g., if the offset is 5, the uplink beam may be associated with SSB6).

In some examples (e.g., as described with reference to the second example of FIG. 2), receiving the indicator includes receiving a set of indices (e.g., {6,7,10}) for the set of ROs, where a first index of the set of indices indicates a correspondence between the RO and the first uplink beam of the set of uplink beams (e.g., 6 may indicate that RO1 maps to an uplink beam associated with SSB6, 7 may indicate that RO2 maps to an uplink beam associated with SSB7, and 10 may indicate that RO3 maps to an uplink beam associated with SSB10). In some examples (e.g., as described with reference to the third example of FIG. 2), receiving the indicator includes receiving an index that indicates a mapping pattern configured at the UE (e.g., a mapping pattern of the set of mapping patterns), where the mapping pattern indicates a correspondence between the set of ROs and the set of uplink beams. For instance, an index of 1 may indicate a mapping pattern of {6, 7, 10} and an index of 2 may indicate a mapping pattern of {8, 4, 9}. In some examples, the indicator is conveyed via RMSI signaling. In some examples, the RO at least partially overlaps in time with a respective SSB associated with the RO for the mapping.

At 415, base station 105-f may transmit, to UE 115-g, one or more parameters indicating a set of transmit power offsets for the set of ROs. For instance, base station 105-f may indicate an offset of delta1 for RO1, an offset of delta2 for RO2, and an offset of delta1 for RO3.

At 420, UE 115-g may transmit a random access preamble to base station 105-f over a RO (e.g., RO1) of the set of ROs using a first uplink beam associated with the RO based on the mapping. In some examples, the RO overlaps in time with a first SSB resource (e.g., SSB1), where the first SSB resource is associated with a first downlink beam of the set of downlink beams that is paired with the first uplink beam for the RO (e.g., the downlink beam of SSB1 and the uplink beam that RO1 maps to according to the indicator may be paired). In some examples, the first uplink beam may be associated with a second downlink beam (e.g., a downlink beam for SSB6) that is used by base station 105-f for receiving the random access preamble. In some examples, the second downlink beam may be different than the first downlink beam. In some examples, transmitting the random access preamble using the first uplink beam is based on receiving the indication of the set of mapping patterns. In some examples, transmitting the random access preamble is based on a respective transmit power associated with the RO. In some examples, transmitting the random access preamble using the first uplink beam is based on receiving the offset. In some examples, transmitting the random access preamble using the first uplink beam is based on receiving the set of indices. In some examples, transmitting the random access preamble using the first uplink beam is based on receiving the index.

At 425, base station 105-*f* may transmit, to UE 115-*g*, an SSB via the first downlink beam. In some such examples, transmitting the random access preamble over the random access occasion using the first uplink beam is based on a correspondence between the random access occasion and the first uplink beam.

At 430, base station 105-*f* may transmit, to UE 115-*f* in a full-duplex mode with receiving the random access preamble transmitted via the first uplink beam, a SSB received via the first downlink beam. In some such examples, receiving the random access preamble over the RO and transmitted via the first uplink beam may be based on a correspondence between the RO and the first uplink beam. In some examples, one or more of 420, 425, and 430 may occur simultaneously for at least a portion of time (e.g., may at least partially overlap in time).

In some examples, UE 115-*g* may receive, in a full-duplex mode with transmitting the random access preamble using the first beam, an SSB (e.g., the SSB transmitted at 425 or another SSB transmitted before 420) via the first downlink beam, where transmitting the random access preamble over the RO using the first uplink beam is based on a correspondence between the RO and the first uplink beam. In some such examples, UE 115-*g* may select the RO from the set of ROs based on an RSRP associated with the first uplink beam satisfying a threshold.

In some examples, the first uplink beam associated with the RO corresponds to a full-duplex mode of UE 115-*g* and a second uplink beam associated with a second RO corresponds to a half-duplex mode of UE 115-*g*. In some examples, the full-duplex mode may be associated with reception of one or more SSBs that overlap in time with transmission of the random access preamble. In some examples, the RO and the second RO are associated with a same uplink beam based on the first uplink beam corresponding to the full-duplex mode and the second uplink beam corresponding to the half-duplex mode.

Figure 5:
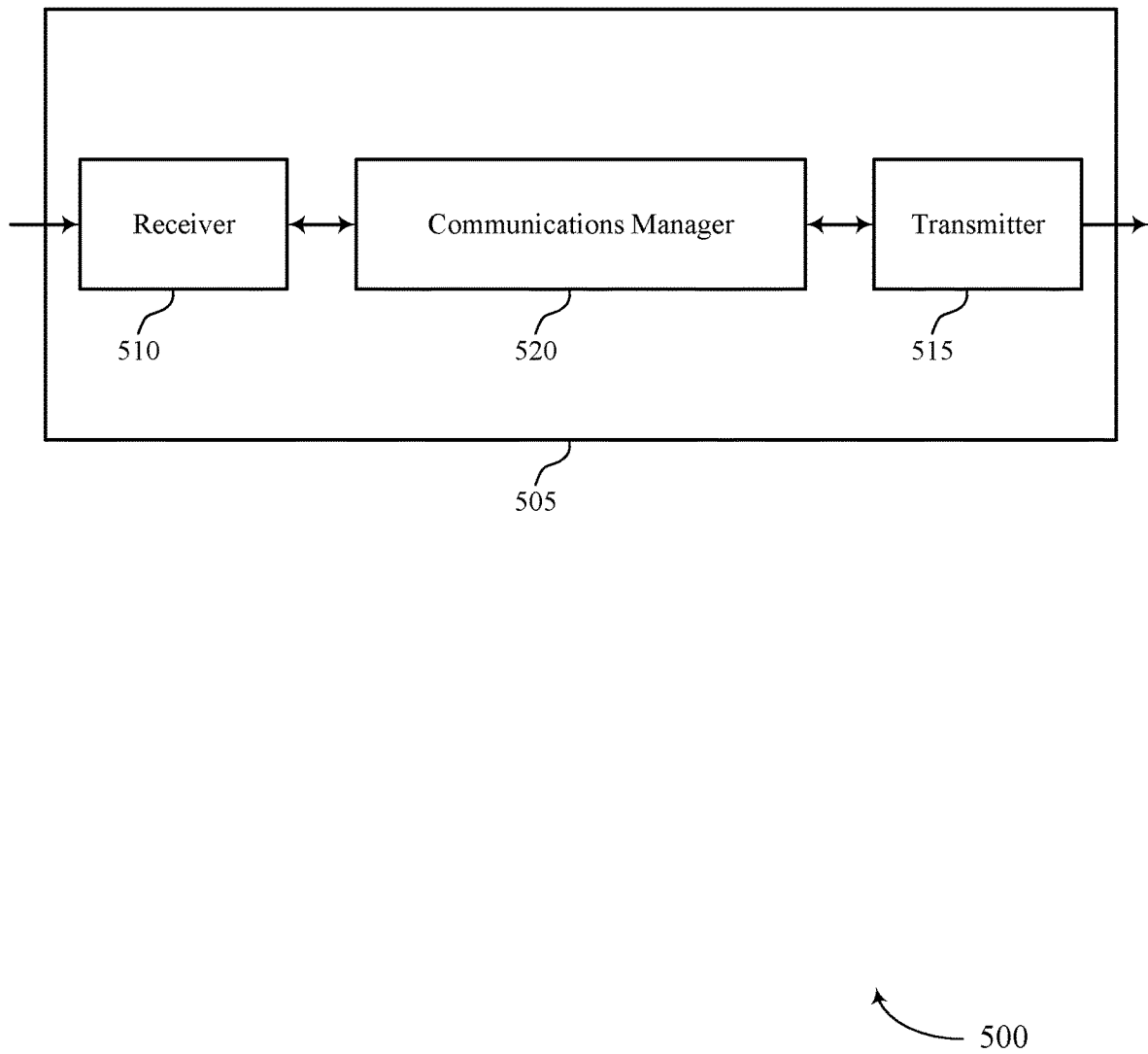
FIGS. 5 and 6 show block diagrams of devices that support full duplex random access occasion configuration in accordance with aspects of the present disclosure.

FIG. 5 shows a block diagram 500 of a device 505 that supports full duplex random access occasion configuration in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to full duplex random access occasion configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to full duplex random access occasion configuration). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of full duplex random access occasion configuration as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. The communications manager 520 may be configured as or otherwise support a means for transmitting, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for the device 505 to reduce interference between a synchronization signal block and a random access preamble by mapping a random access occasion to an uplink beam that is associated with a synchronization signal block resource with an index different from the synchronization signal block resource overlapping in time with the random access occasion.

Figure 6:
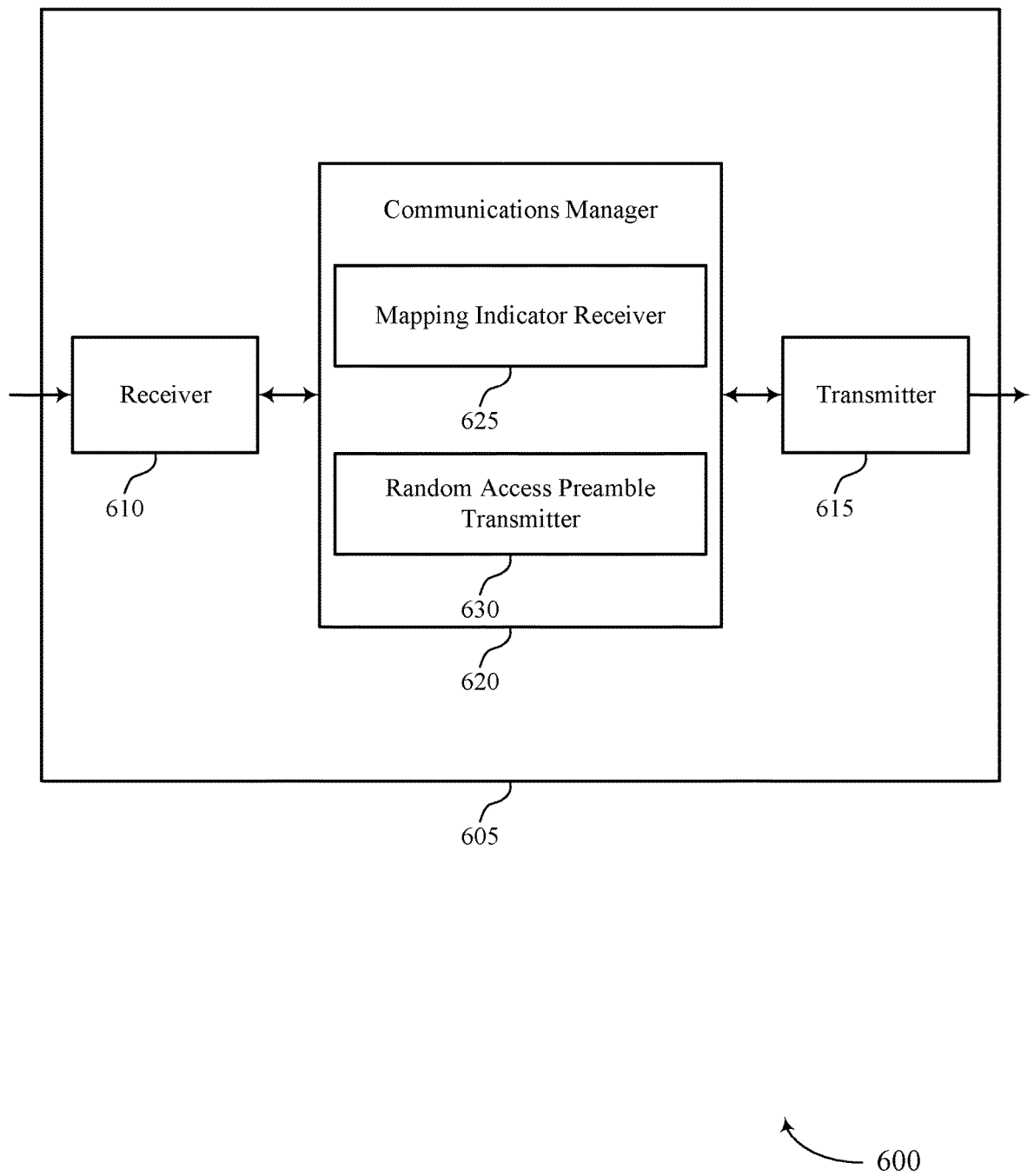

FIG. 6 shows a block diagram 600 of a device 605 that supports full duplex random access occasion configuration in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to full duplex random access occasion configuration). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to full duplex random access occasion configuration). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of full duplex random access occasion configuration as described herein. For example, the communications manager 620 may include a mapping indicator receiver 625 a random access preamble transmitter 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The mapping indicator receiver 625 may be configured as or otherwise support a means for receiving, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. The random access preamble transmitter 630 may be configured as or otherwise support a means for transmitting, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

Figure 7:
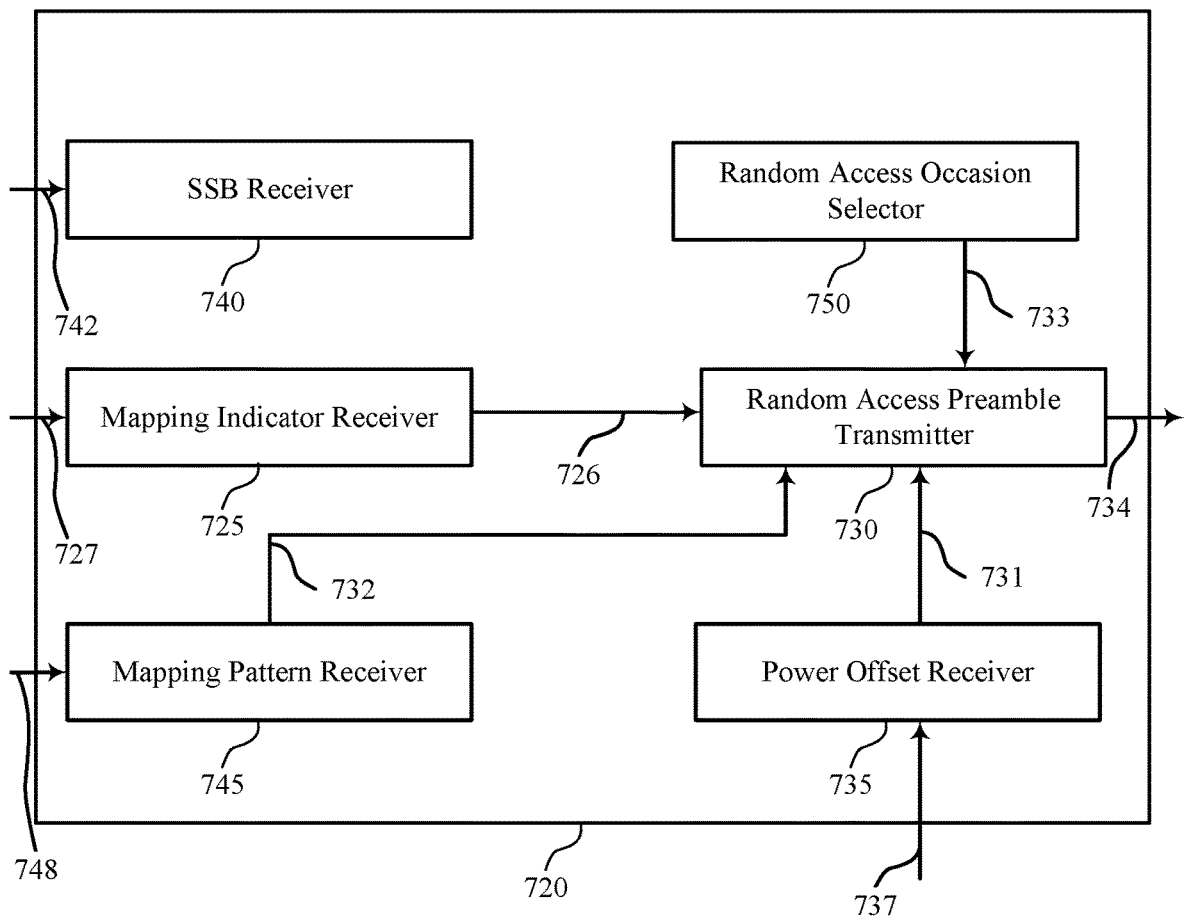
FIG. 7 shows a block diagram of a communications manager that supports full duplex random access occasion configuration in accordance with aspects of the present disclosure.

FIG. 7 shows a block diagram 700 of a communications manager 720 that supports full duplex random access occasion configuration in accordance with aspects of the present disclosure. The communications manager 720 may be an example of aspects of a communications manager 520, a communications manager 620, or both, as described herein. The communications manager 720, or various components thereof, may be an example of means for performing various aspects of full duplex random access occasion configuration as described herein. For example, the communications manager 720 may include a mapping indicator receiver 725, a random access preamble transmitter 730, a power offset receiver 735, an SSB receiver 740, a mapping pattern receiver 745, a random access occasion selector 750, or any combination thereof. Each of these components may communicate, directly or indirectly, with one another (e.g., via one or more buses).

The communications manager 720 may support wireless communication at a UE in accordance with examples as disclosed herein. The mapping indicator receiver 725 may be configured as or otherwise support a means for receiving, from a base station, an indicator 727 of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. In some examples, the mapping indicator receiver 725 may provide an indicator 726 of the mapping to random access preamble transmitter 730. The random access preamble transmitter 730 may be configured as or otherwise support a means for transmitting, to the base station, a random access preamble 734 over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble 734, and where the second downlink beam is different than the first downlink beam.

In some examples, to support receiving the indicator, the mapping indicator receiver 725 may be configured as or otherwise support a means for receiving an offset of the set of uplink beams associated with the set of random access occasions and relative to the set of downlink beams associated with the set of synchronization signal block resources, where a first index associated with the first uplink beam is based on the random access occasion and the offset, and where transmitting the random access preamble 734 using the first uplink beam is based on receiving the offset.

In some examples, to support receiving the indicator, the mapping indicator receiver 725 may be configured as or otherwise support a means for receiving a set of indices for the set of random access occasions, where a first index of the set of indices indicates a correspondence between the random access occasion and the first uplink beam of the set of uplink beams, where transmitting the random access preamble 734 using the first uplink beam is based on receiving the set of indices.

In some examples, to support receiving the indicator, the mapping indicator receiver 725 may be configured as or otherwise support a means for receiving an index that indicates a mapping pattern configured at the UE, where the mapping pattern indicates a correspondence between the set of random access occasions and the set of uplink beams, and where transmitting the random access preamble 734 using the first uplink beam is based on receiving the index.

In some examples, the mapping pattern receiver 745 may be configured as or otherwise support a means for receiving, from the base station, an indication 748 of a set of mapping patterns, where each mapping pattern of the set indicates the respective uplink beam for each random access occasion of the set of random access occasions where transmitting the random access preamble 734 using the first uplink beam is based on receiving the indication of the set of mapping patterns. In some examples mapping pattern receiver 745 may provide an indication 732 of the set of mapping patterns to random access preamble transmitter 730.

In some examples, the power offset receiver 735 may be configured as or otherwise support a means for receiving one or more parameters 737 indicating a set of transmit power offsets for the set of random access occasions, where transmitting the random access preamble 734 is based on a respective transmit power associated with the random access occasion. In some examples, the power offset receiver 735 may provide an indication 731 of the one or more parameters to random access preamble transmitter 730.

In some examples, the SSB receiver 740 may be configured as or otherwise support a means for receiving, in a full-duplex mode with transmitting the random access preamble using the first uplink beam, a synchronization signal block 742 via the first downlink beam, where transmitting the random access preamble 734 over the random access occasion using the first uplink beam is based on a correspondence between the random access occasion and the first uplink beam.

In some examples, the random access occasion selector 750 may be configured as or otherwise support a means for selecting the random access occasion from the set of random access occasions based on a reference signal received power associated with the first uplink beam satisfying a threshold. In some examples, the random access occasion selector 750 may provide an indication 733 of the random access preamble to random access preamble transmitter 730.

In some examples, the first uplink beam associated with the random access occasion corresponds to a full-duplex mode of the UE and a second uplink beam associated with a second random access occasion corresponds to a half-duplex mode of the UE. In some examples, the full-duplex mode is associated with reception of one or more synchronization signal blocks that overlap in time with transmission of the random access preamble. In some examples, the random access occasion and the second random access occasion are associated with a same uplink beam based on the first uplink beam corresponding to the full-duplex mode and the second uplink beam corresponding to the half-duplex mode.

In some examples, the indicator 727 is conveyed via remaining minimum system information signaling.

In some examples, the random access occasion at least partially overlaps in time with a respective synchronization signal block associated with the random access occasion for the mapping.

Figure 8:
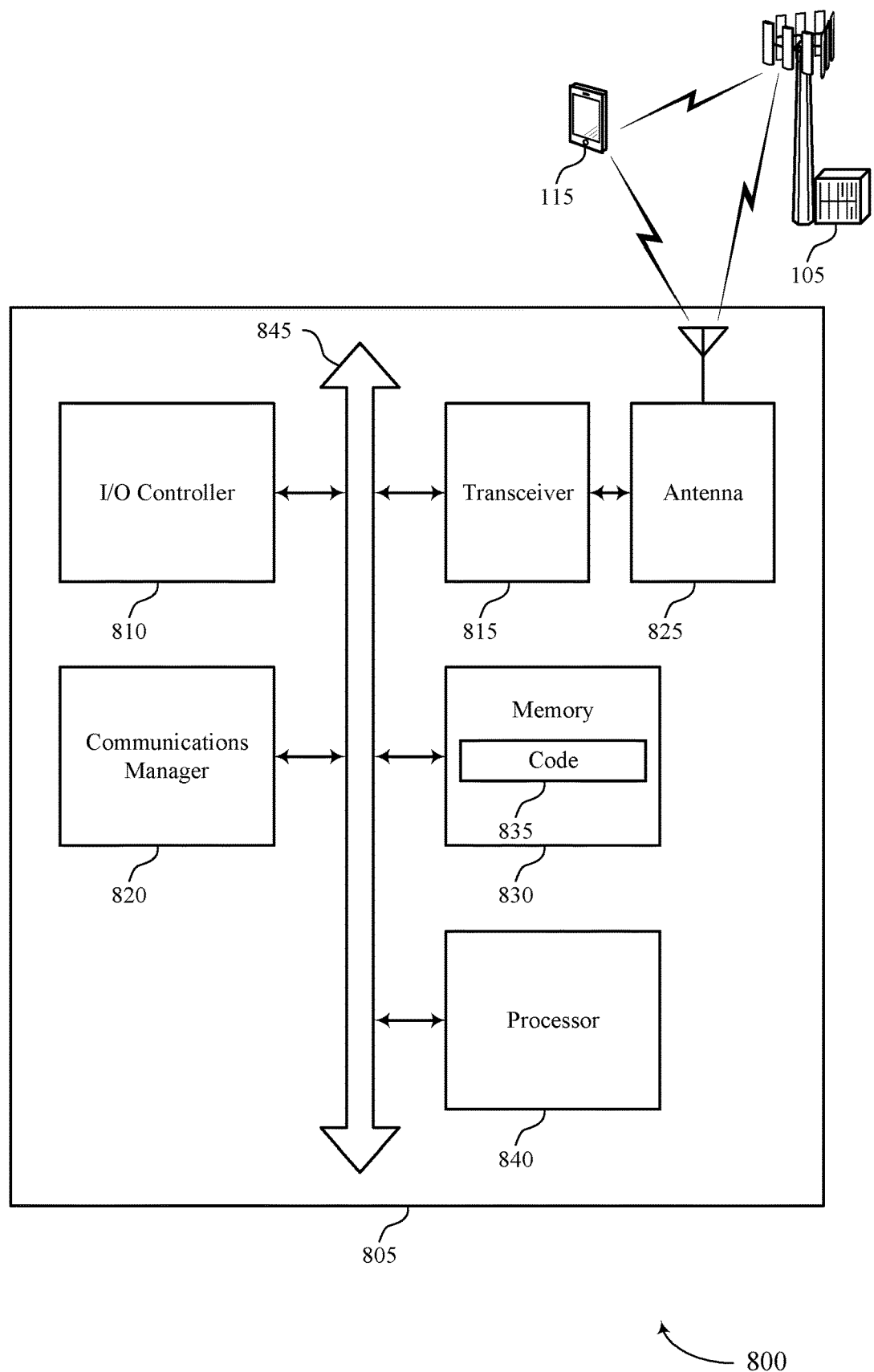
FIG. 8 shows a diagram of a system including a device that supports full duplex random access occasion configuration in accordance with aspects of the present disclosure.

FIG. 8 shows a diagram of a system 800 including a device 805 that supports full duplex random access occasion configuration in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting full duplex random access occasion configuration). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. The communications manager 820 may be configured as or otherwise support a means for transmitting, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam.

By including or configuring the communications manager 820 in accordance with examples as described herein, the device 805 may support techniques for the device 805 to reduce interference between a synchronization signal block and a random access preamble by mapping a random access occasion to an uplink beam that is associated with a synchronization signal block resource with an index different from the synchronization signal block resource overlapping in time with the random access occasion.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of full duplex random access occasion configuration as described herein, or the processor 840 and the memory 830 may be otherwise configured to perform or support such operations.

Figure 9:
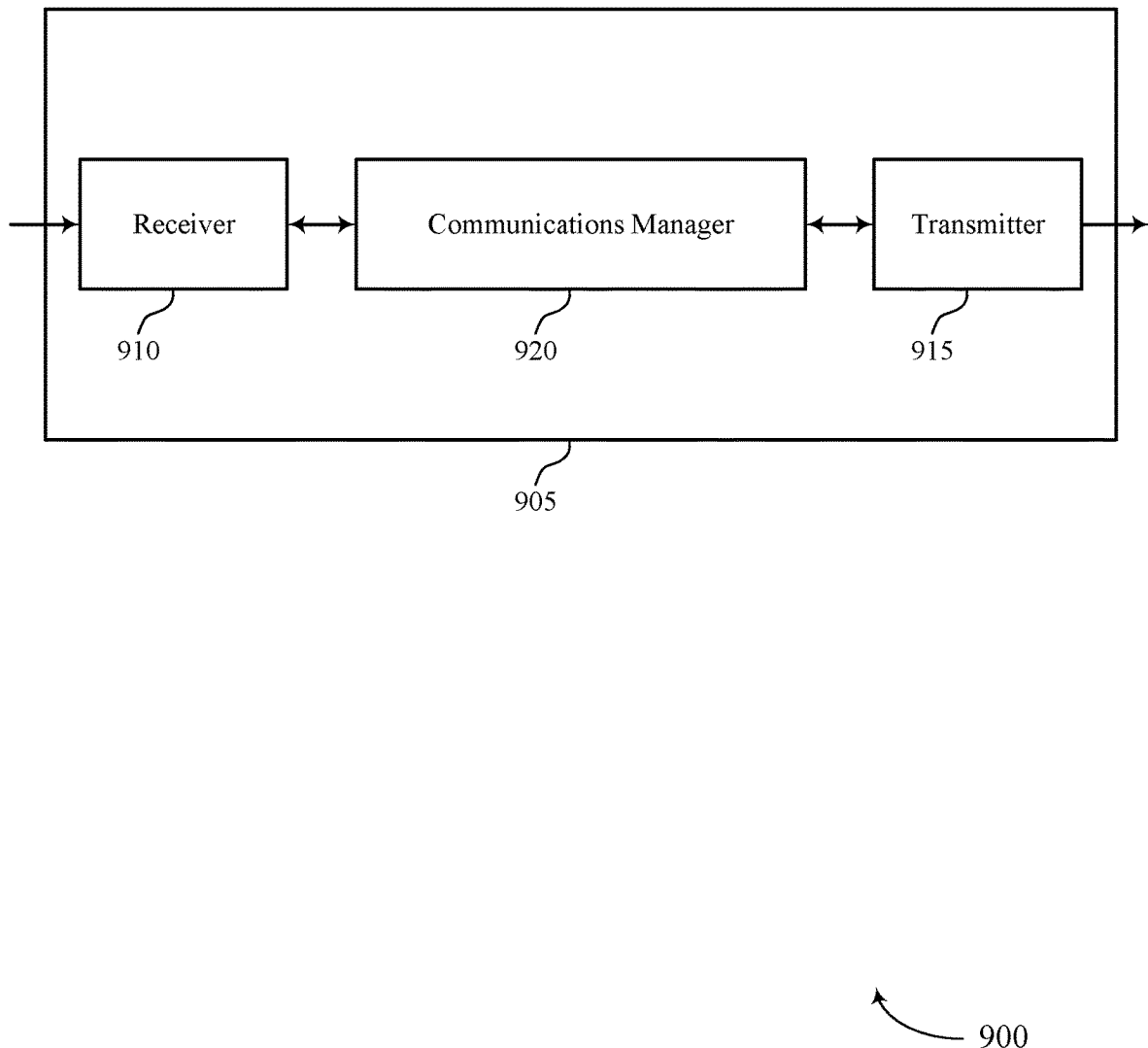
FIGS. 9 and 10 show block diagrams of devices that support full duplex random access occasion configuration in accordance with aspects of the present disclosure.

FIG. 9 shows a block diagram 900 of a device 905 that supports full duplex random access occasion configuration in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to full duplex random access occasion configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to full duplex random access occasion configuration). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of full duplex random access occasion configuration as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. The communications manager 920 may be configured as or otherwise support a means for receiving, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for the device 905 to reduce interference between a synchronization signal block and a random access preamble by providing an indicator of a mapping between a random access occasion and an uplink beam that is associated with a synchronization signal block resource with an index different from the synchronization signal block resource overlapping in time with the random access occasion.

Figure 10:
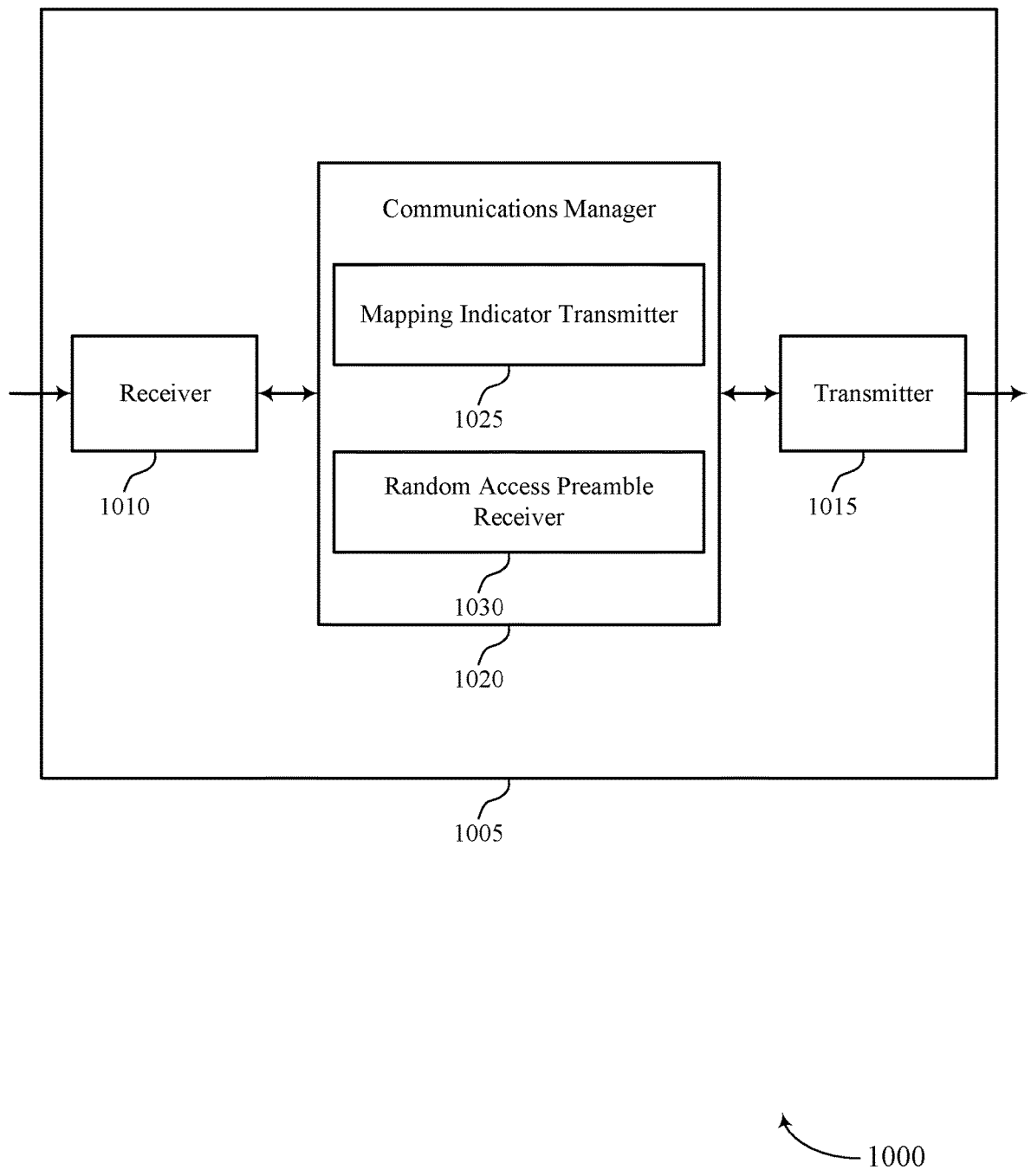

FIG. 10 shows a block diagram 1000 of a device 1005 that supports full duplex random access occasion configuration in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to full duplex random access occasion configuration). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to full duplex random access occasion configuration). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of full duplex random access occasion configuration as described herein. For example, the communications manager 1020 may include a mapping indicator transmitter 1025 a random access preamble receiver 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The mapping indicator transmitter 1025 may be configured as or otherwise support a means for transmitting, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. The random access preamble receiver 1030 may be configured as or otherwise support a means for receiving, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

Figure 11:
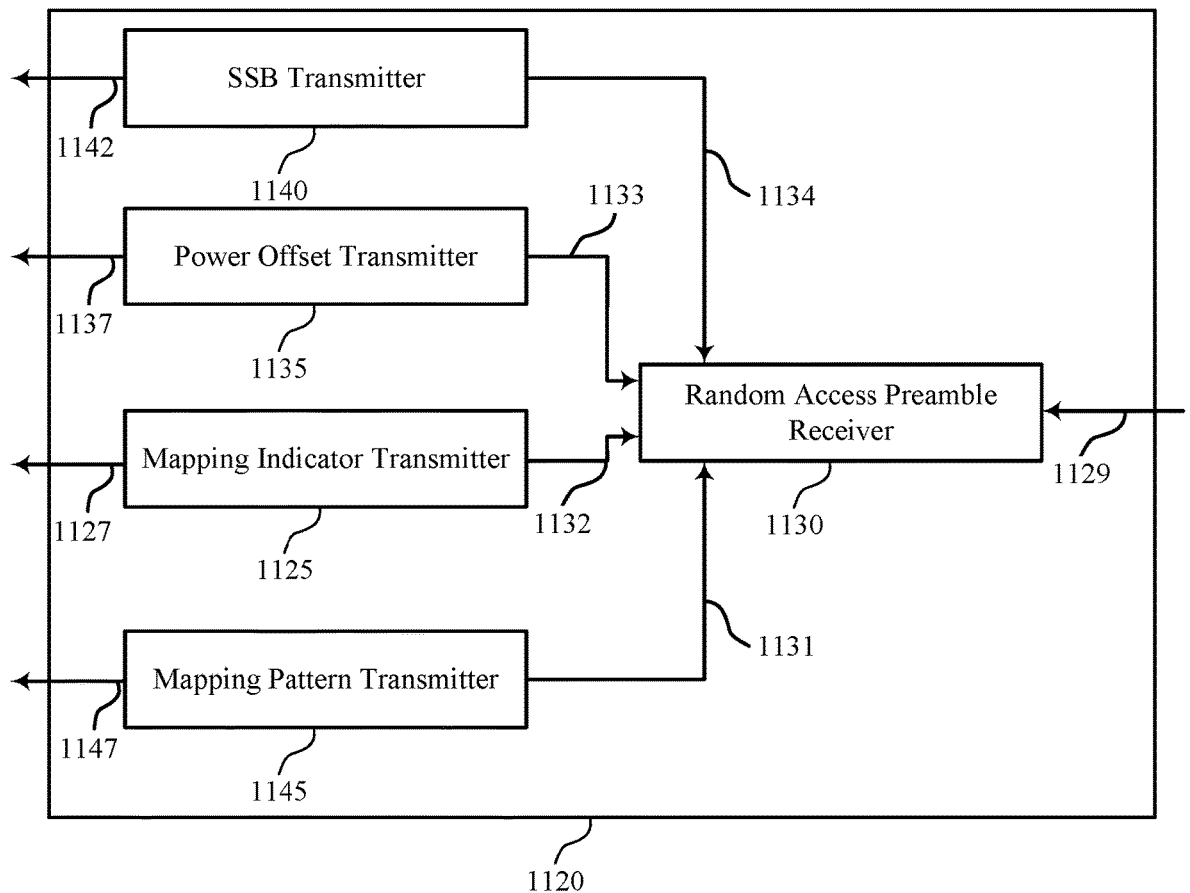
FIG. 11 shows a block diagram of a communications manager that supports full duplex random access occasion configuration in accordance with aspects of the present disclosure.

FIG. 11 shows a block diagram 1100 of a communications manager 1120 that supports full duplex random access occasion configuration in accordance with aspects of the present disclosure. The communications manager 1120 may be an example of aspects of a communications manager 920, a communications manager 1020, or both, as described herein. The communications manager 1120, or various components thereof, may be an example of means for performing various aspects of full duplex random access occasion configuration as described herein. For example, the communications manager 1120 may include a mapping indicator transmitter 1125, a random access preamble receiver 1130, a power offset transmitter 1135, an SSB transmitter 1140, a mapping pattern transmitter 1145, or any combination thereof. Each of these components may communicate, directly or indirectly, with one another (e.g., via one or more buses).

The communications manager 1120 may support wireless communication at a base station in accordance with examples as disclosed herein. The mapping indicator transmitter 1125 may be configured as or otherwise support a means for transmitting, to a UE, an indicator 1127 of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. In some examples, the mapping indicator transmitter 1125 may provide an indication 1132 of the mapping to random access preamble receiver 1130. The random access preamble receiver 1130 may be configured as or otherwise support a means for receiving, from the UE, a random access preamble 1129 over a random access occasion of the set of random access occasions transmitted via a first uplink beam of the set of uplink beams associated with the random access occasion based on transmitting the indicator 1127 of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble 1129 by the base station, and where the second downlink beam is different than the first uplink beam.

In some examples, to support transmitting the indicator, the mapping indicator transmitter 1125 may be configured as or otherwise support a means for transmitting an offset of the set of uplink beams associated with the set of random access occasions and relative to the set of downlink beams associated with the set of synchronization signal block resources, where a first index associated with the first uplink beam is equal to a second index associated with the random access occasion combined with the offset, and where receiving the random access preamble 1129 transmitted via the first uplink beam is based on transmitting the offset.

In some examples, to support transmitting the indicator, the mapping indicator transmitter 1125 may be configured as or otherwise support a means for transmitting an index for each random access occasion indicating a correspondence between the random access occasion and a respective uplink beam of the set of uplink beams, where receiving the random access preamble 1129 transmitted via the first uplink beam is based on transmitting the index for each random access occasion.

In some examples, to support transmitting the indicator, the mapping indicator transmitter 1125 may be configured as or otherwise support a means for transmitting a set of indices for the set of random access occasions, where a first index of the set of indices indicates a correspondence between the random access occasion and the first uplink beam of the set of uplink beams, where receiving the random access preamble 1129 transmitted via the first uplink beam is based on transmitting the set of indices.

In some examples, the mapping pattern transmitter 1145 may be configured as or otherwise support a means for transmitting, to the UE, an index 1147 that indicates a mapping pattern configured at the UE, where the mapping pattern indicates a correspondence between the set of random access occasions and the set of uplink beams, and where receiving the random access preamble 1129 transmitted via the first uplink beam is based on transmitting the index. In some examples, the mapping pattern transmitter 1145 may provide an indication 1131 of the index to random access preamble receiver 1130.

In some examples, the power offset transmitter 1135 may be configured as or otherwise support a means for transmitting one or more parameters 1137 indicating a set of transmit power offsets for the set of random access occasions, where receiving the random access preamble 1129 is based on a respective transmit power associated with the random access occasion. In some examples, the power offset transmitter 1135 may provide an indication 1133 of the one or more parameters to random access preamble receiver 1130.

In some examples, the SSB transmitter 1140 may be configured as or otherwise support a means for transmitting, to a second UE, a synchronization signal block 1142 over the first synchronization signal block resource, where receiving the random access preamble 1129 transmitted via the first uplink beam is based on transmitting the synchronization signal block 1142 over the first synchronization signal block resource. In some examples, the SSB transmitter 1140 may provide an indication of the SSB to random access preamble receiver 1130.

In some examples, the SSB transmitter 1140 may be configured as or otherwise support a means for transmitting, to the UE in a full-duplex mode with receiving the random access preamble 1129 transmitted via the first uplink beam, a synchronization signal block received via the first downlink beam, where receiving the random access preamble 1129 over the random access occasion and transmitted via the first uplink beam is based on a correspondence between the random access occasion and the first uplink beam.

In some examples, the first uplink beam of the random access occasion corresponds to a full-duplex mode of the UE and a second uplink beam of a second random access occasion corresponds to a half-duplex mode of the UE. In some examples, the full-duplex mode is associated with reception of one or more synchronization signal blocks that overlap in time with transmission of the random access preamble. In some examples, the random access occasion and the second random access occasion are associated with a same uplink beam based on the first uplink beam corresponding to the full-duplex mode and the second uplink beam corresponding to the half-duplex mode.

In some examples, the indicator 1127 is conveyed via remaining minimum system information signaling.

In some examples, the random access occasion at least partially overlaps in time with a respective synchronization signal block associated with the random access occasion in the mapping.

Figure 12:
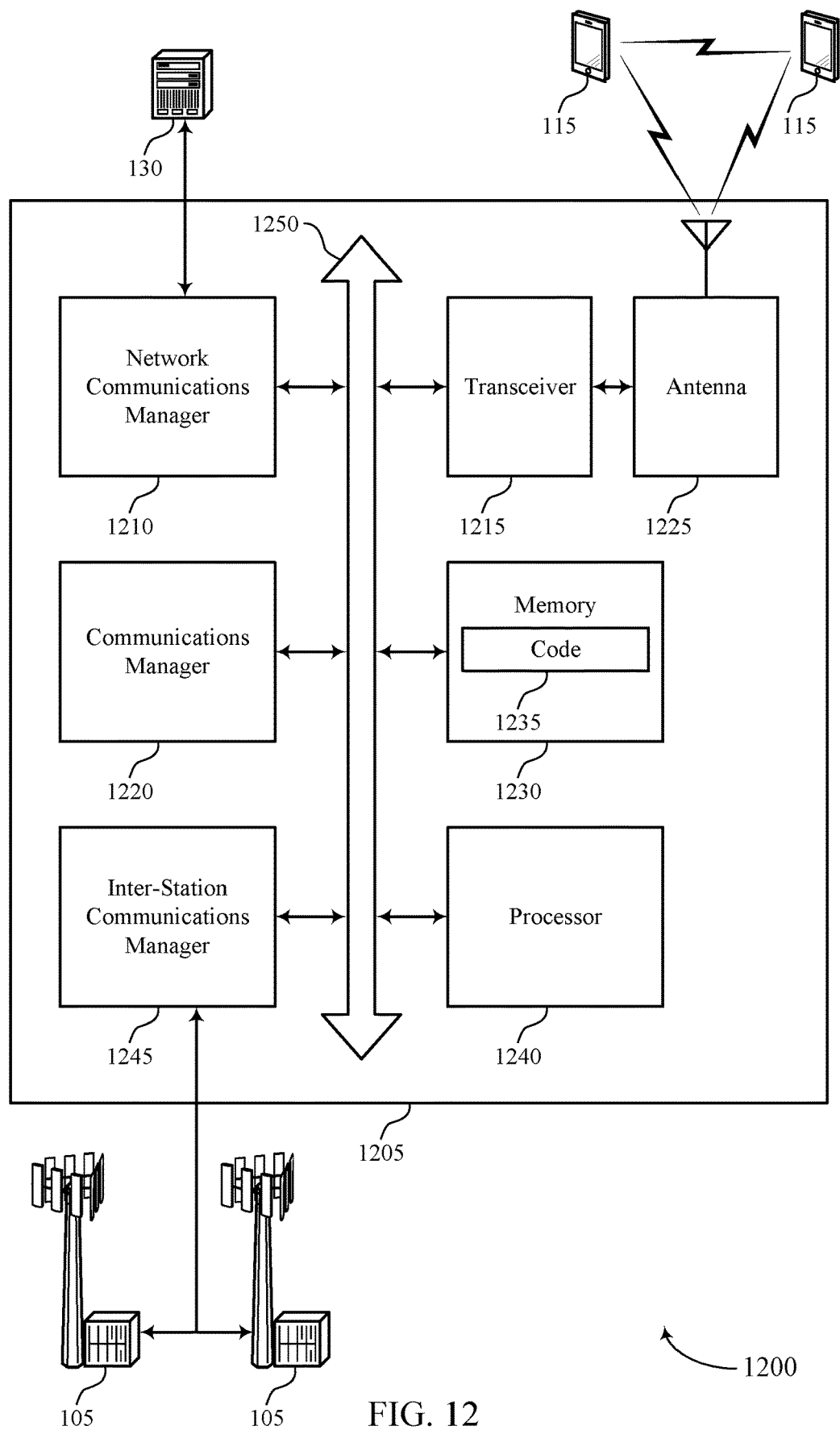
FIG. 12 shows a diagram of a system including a device that supports full duplex random access occasion configuration in accordance with aspects of the present disclosure.

FIG. 12 shows a diagram of a system 1200 including a device 1205 that supports full duplex random access occasion configuration in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting full duplex random access occasion configuration). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. The communications manager 1220 may be configured as or otherwise support a means for receiving, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam.

By including or configuring the communications manager 1220 in accordance with examples as described herein, the device 1205 may support techniques for the device 1205 to reduce interference between a synchronization signal block and a random access preamble by providing an indicator of a mapping between a random access occasion and an uplink beam that is associated with a synchronization signal block resource with an index different from the synchronization signal block resource overlapping in time with the random access occasion In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of full duplex random access occasion configuration as described herein, or the processor 1240 and the memory 1230 may be otherwise configured to perform or support such operations.

Figure 13:
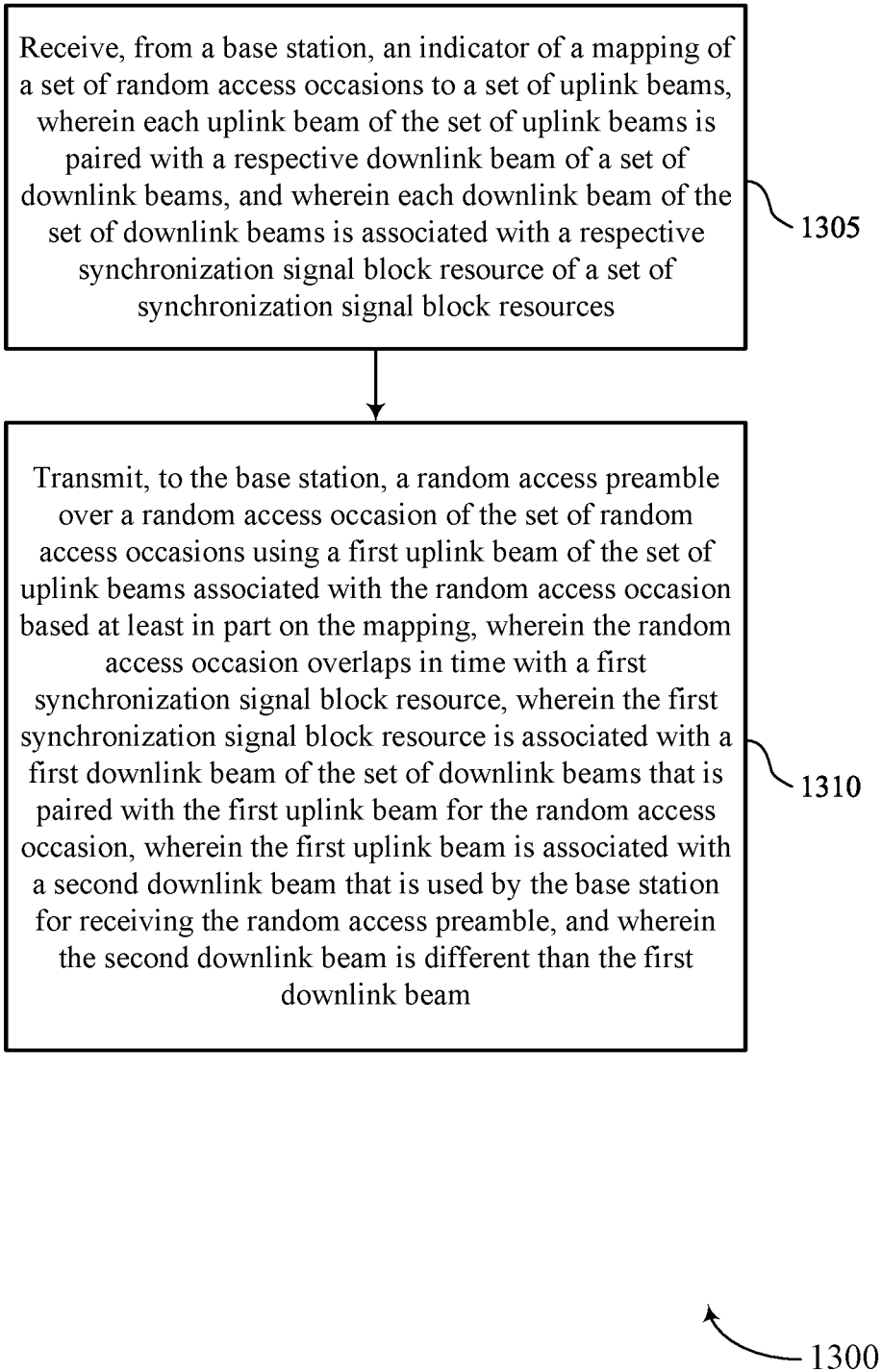
FIGS. 13 through 17 show flowcharts illustrating methods that support full duplex random access occasion configuration in accordance with aspects of the present disclosure.

FIG. 13 shows a flowchart illustrating a method 1300 that supports full duplex random access occasion configuration in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. In some examples, receiving the indicator may include identifying time-frequency resources over which the indicator is received; demodulating a transmission over those time-frequency resources, and decoding the demodulated transmission to obtain bits that include the indicator. The operations of 1305 may be performed in accordance with examples as disclosed herein. In some examples, aspects of the operations of 1305 may be performed by a mapping indicator receiver 725 as described with reference to FIG. 7.

At 1310, the method may include transmitting, to the base station, a random access preamble over a random access occasion of the set of random access occasions using a first uplink beam of the set of uplink beams associated with the random access occasion based on the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam that is used by the base station for receiving the random access preamble, and where the second downlink beam is different than the first downlink beam. In some examples, transmitting the random access preamble may include identifying a random access occasion for transmitting the random access preamble, modulating the random access preamble, and transmitting the modulated random access preamble using the first uplink beam. The operations of 1310 may be performed in accordance with examples as disclosed herein. In some examples, aspects of the operations of 1310 may be performed by a random access preamble transmitter 730 as described with reference to FIG. 7.

Figure 14:
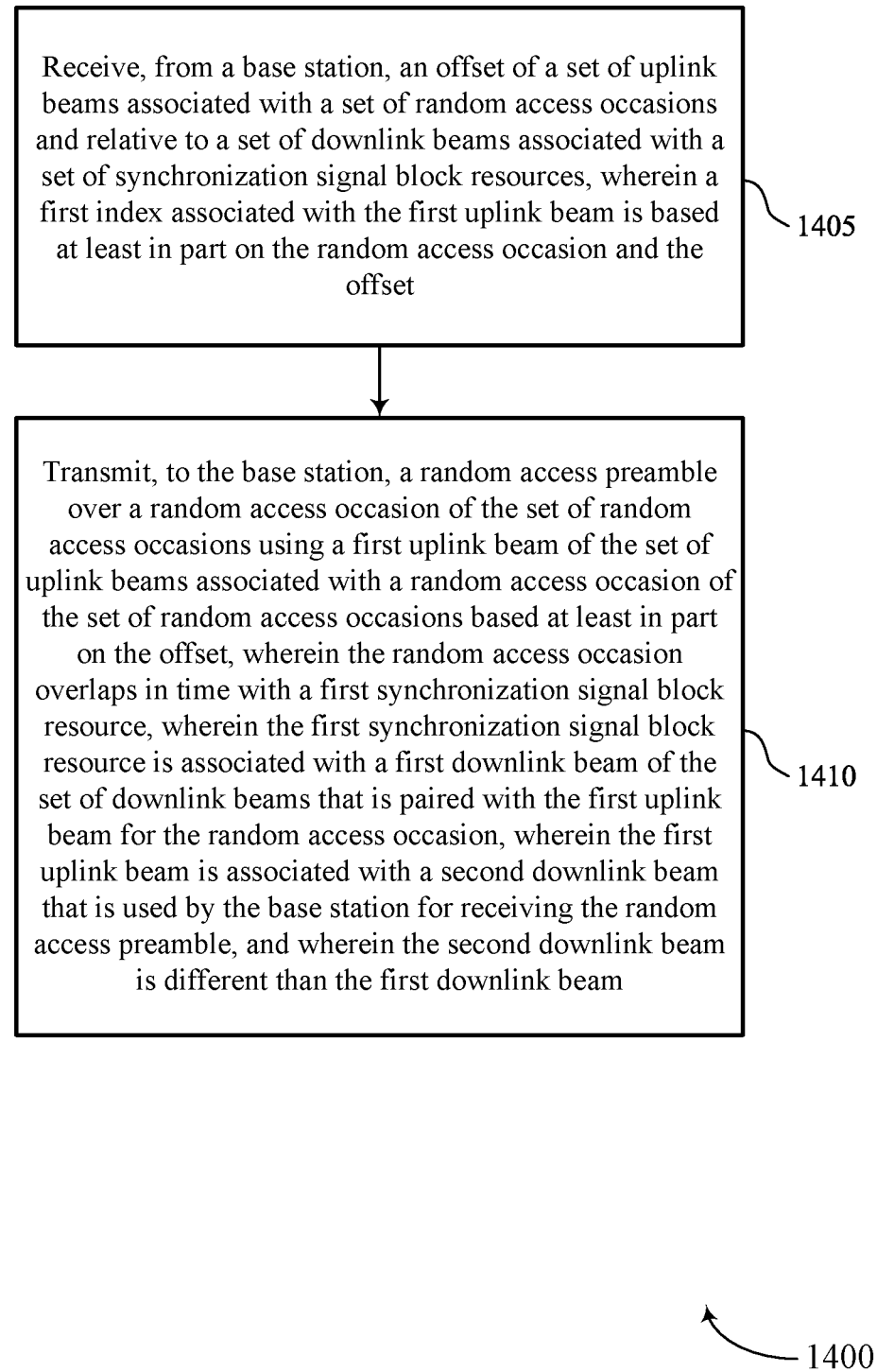

FIG. 14 shows a flowchart illustrating a method 1400 that supports full duplex random access occasion configuration in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station, an offset of a set of uplink beams associated with a set of random access occasions and relative to a set of downlink beams associated with a set of synchronization signal block resources, wherein a first index associated with the first uplink beam is based at least in part on the random access occasion and the offset. In some examples, receiving the offset may include identifying time-frequency resources over which the offset is received; demodulating a transmission over those time-frequency resources, and decoding the demodulated transmission to obtain bits that include the offset. The operations of 1405 may be performed in accordance with examples as disclosed herein. In some examples, aspects of the operations of 1405 may be performed by a mapping indicator receiver 725 as described with reference to FIG. 7.

At 1410, the method may include transmitting, to the base station, a random access preamble over a random access occasion of the set of random access occasions using a first uplink beam of the set of uplink beams associated with a random access occasion of the set of random access occasions based at least in part on the offset, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam that is used by the base station for receiving the random access preamble, and wherein the second downlink beam is different than the first downlink beam. In some examples, transmitting the random access preamble may include identifying a random access occasion for transmitting the random access preamble, modulating the random access preamble, and transmitting the modulated random access preamble using the first uplink beam. The operations of 1410 may be performed in accordance with examples as disclosed herein. In some examples, aspects of the operations of 1410 may be performed by a random access preamble transmitter 730 as described with reference to FIG. 7.

Figure 15:
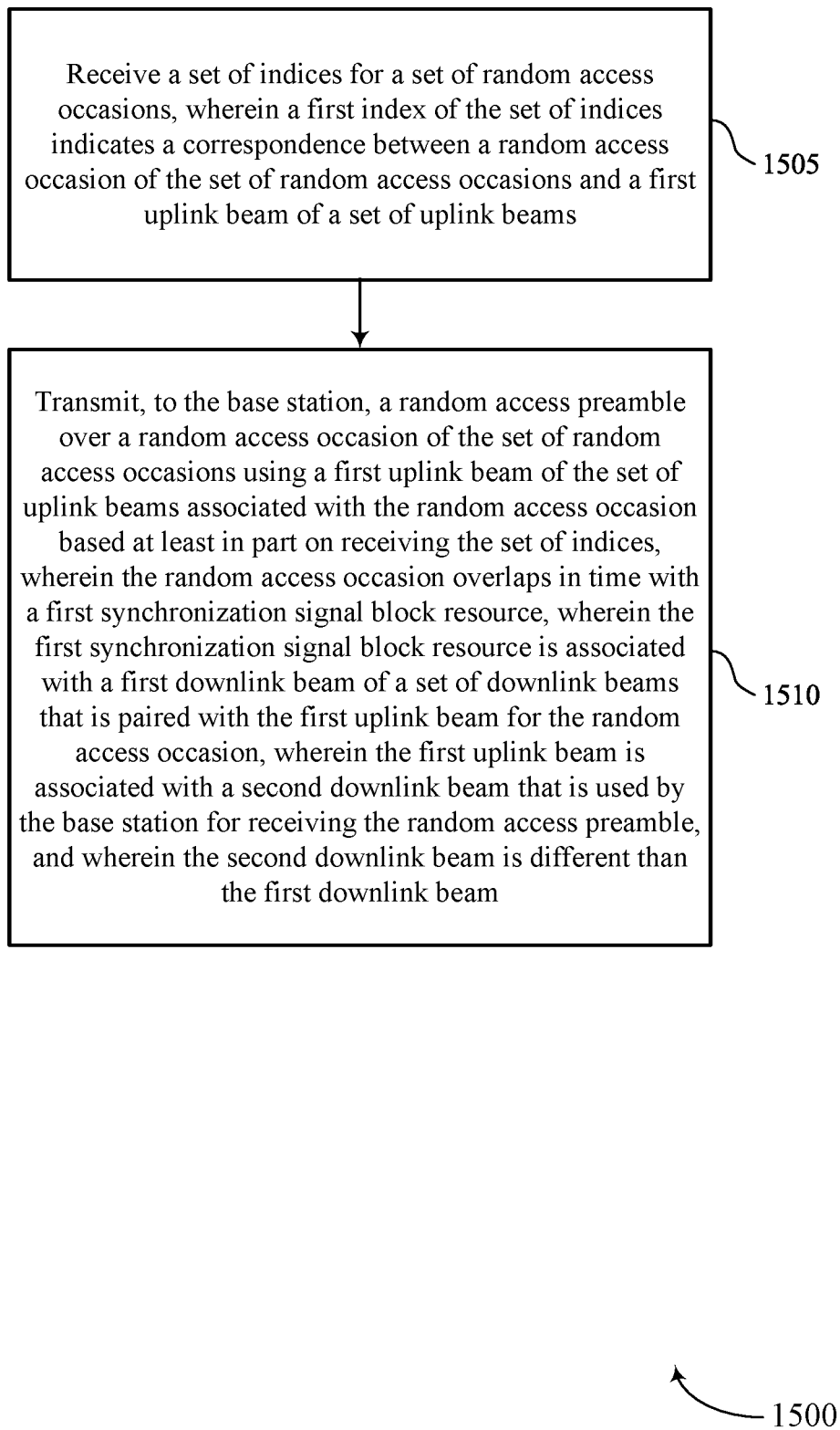

FIG. 15 shows a flowchart illustrating a method 1500 that supports full duplex random access occasion configuration in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, a set of indices for a set of random access occasions, wherein a first index of the set of indices indicates a correspondence between a random access occasion of the set of random access occasions and a first uplink beam of a set of uplink beams. In some examples, receiving the set of indices may include identifying time-frequency resources over which the indicator is received; demodulating a transmission over those time-frequency resources, and decoding the demodulated transmission to obtain bits that include the set of indices. The operations of 1505 may be performed in accordance with examples as disclosed herein. In some examples, aspects of the operations of 1505 may be performed by a mapping indicator receiver 725 as described with reference to FIG. 7.

At 1510, the method may include transmitting, to the base station, a random access preamble over a random access occasion of the set of random access occasions using a first uplink beam of the set of uplink beams associated with the random access occasion based at least in part on receiving the set of indices, wherein the random access occasion overlaps in time with a first synchronization signal block resource, wherein the first synchronization signal block resource is associated with a first downlink beam of a set of downlink beams that is paired with the first uplink beam for the random access occasion, wherein the first uplink beam is associated with a second downlink beam that is used by the base station for receiving the random access preamble, and wherein the second downlink beam is different than the first downlink beam. In some examples, transmitting the random access preamble may include identifying a random access occasion for transmitting the random access preamble, modulating the random access preamble, and transmitting the modulated random access preamble using the first uplink beam. The operations of 1510 may be performed in accordance with examples as disclosed herein. In some examples, aspects of the operations of 1510 may be performed by a random access preamble transmitter 730 as described with reference to FIG. 7.

Figure 16:
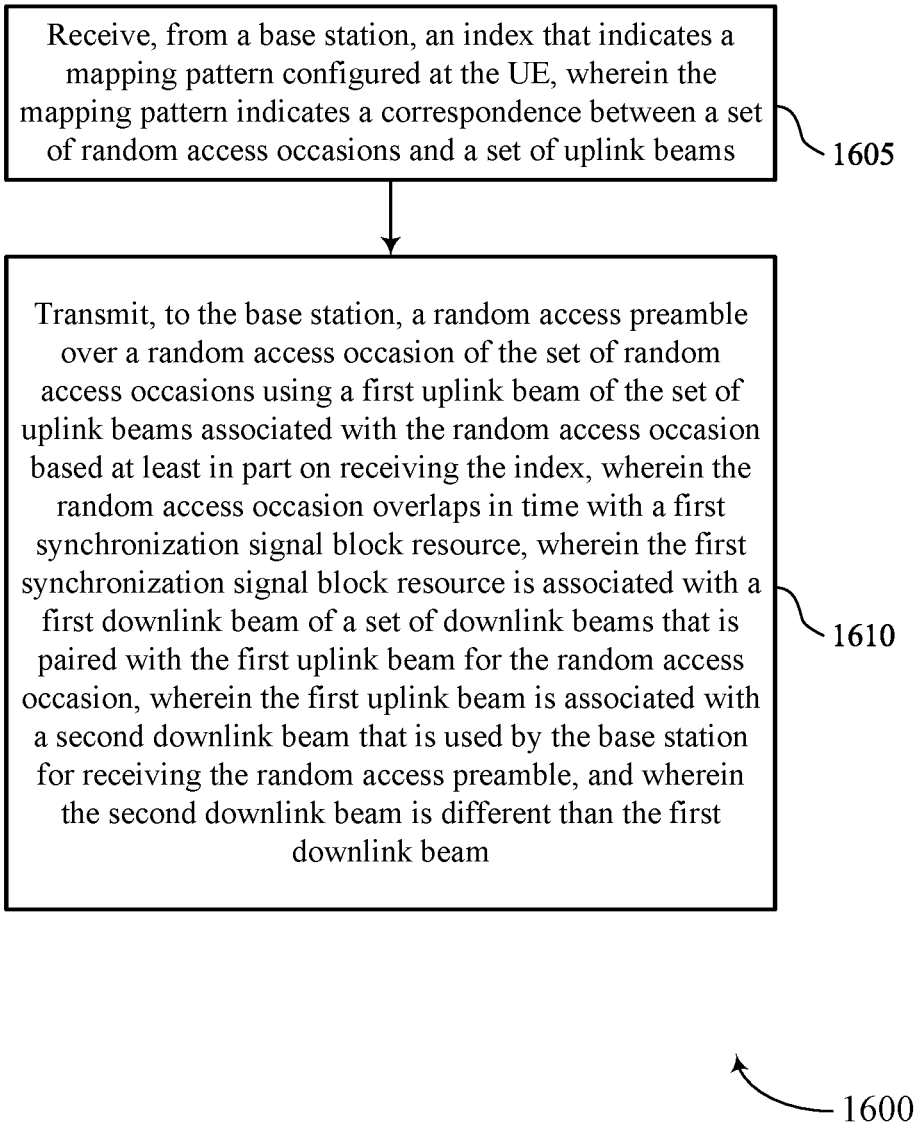

FIG. 16 shows a flowchart illustrating a method 1600 that supports full duplex random access occasion configuration in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, an index that indicates a mapping pattern configured at the UE, wherein the mapping pattern indicates a correspondence between a set of random access occasions and a set of uplink beams. In some examples, receiving the index may include identifying time-frequency resources over which the index is received; demodulating a transmission over those time-frequency resources, and decoding the demodulated transmission to obtain bits that include the index. The operations of 1605 may be performed in accordance with examples as disclosed herein. In some examples, aspects of the operations of 1605 may be performed by a mapping indicator receiver 725 as described with reference to FIG. 7.

At 1610, the method may include transmitting, to the base station, a random access preamble over a random access occasion of the set of random access occasions using a first uplink beam of the set of uplink beams associated with the random access occasion based at least in part on receiving the index, wherein the random access occasion overlaps in time with a first synchronization signal block resource, wherein the first synchronization signal block resource is associated with a first downlink beam of a set of downlink beams that is paired with the first uplink beam for the random access occasion, wherein the first uplink beam is associated with a second downlink beam that is used by the base station for receiving the random access preamble, and wherein the second downlink beam is different than the first downlink beam. In some examples, transmitting the random access preamble may include identifying a random access occasion for transmitting the random access preamble, modulating the random access preamble, and transmitting the modulated random access preamble using the first uplink beam. The operations of 1610 may be performed in accordance with examples as disclosed herein. In some examples, aspects of the operations of 1610 may be performed by a random access preamble transmitter 730 as described with reference to FIG. 7.

Figure 17:
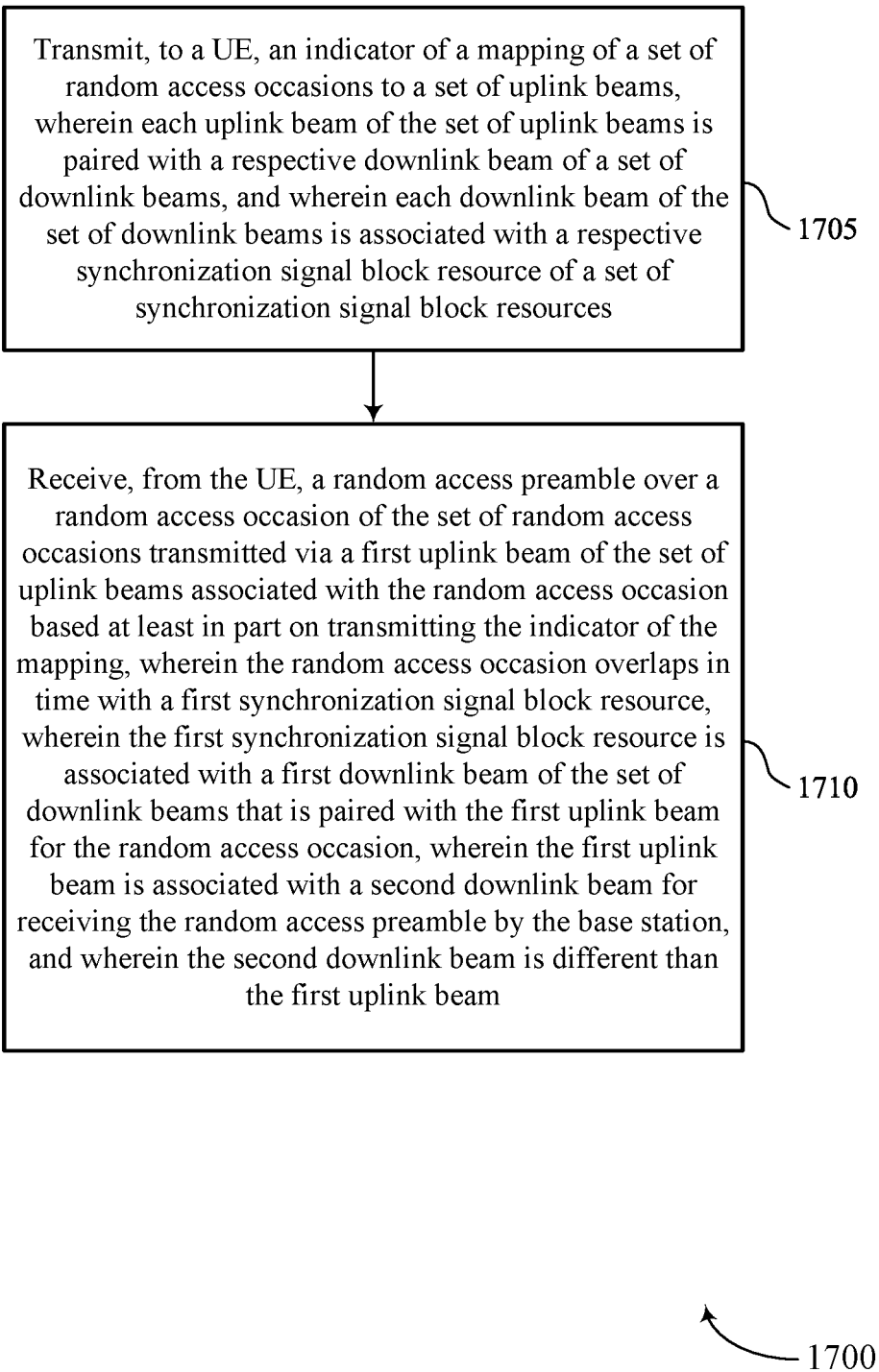

FIG. 17 shows a flowchart illustrating a method 1700 that supports full duplex random access occasion configuration in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, an indicator of a mapping of a set of random access occasions to a set of uplink beams, where each uplink beam of the set of uplink beams is paired with a respective downlink beam of a set of downlink beams, and where each downlink beam of the set of downlink beams is associated with a respective synchronization signal block resource of a set of synchronization signal block resources. In some examples, transmitting the indicator may include identifying time-frequency resources over which the indicator is transmitted; encoding a transmission with one or more bits associated with the indicator; and modulating the transmission over the time-frequency resources. The operations of 1705 may be performed in accordance with examples as disclosed herein. In some examples, aspects of the operations of 1705 may be performed by a mapping indicator transmitter 1125 as described with reference to FIG. 11.

At 1710, the method may include receiving, from the UE, a random access preamble over a random access occasion of the set of random access occasions transmitted via a first uplink beam of the set of uplink beams associated with the random access occasion based on transmitting the indicator of the mapping, where the random access occasion overlaps in time with a first synchronization signal block resource, where the first synchronization signal block resource is associated with a first downlink beam of the set of downlink beams that is paired with the first uplink beam for the random access occasion, where the first uplink beam is associated with a second downlink beam for receiving the random access preamble by the base station, and where the second downlink beam is different than the first uplink beam. In some examples, receiving the random access preamble may include identifying a random access occasion over which the indicator is received; demodulating the random access preamble over that random access occasion, and decoding the random access preamble. The operations of 1710 may be performed in accordance with examples as disclosed herein. In some examples, aspects of the operations of 1710 may be performed by a random access preamble receiver 1130 as described with reference to FIG. 11.

The following provides an overview of aspects of the present disclosure:

Aspect 1: A method for wireless communication at a UE, comprising: receiving, from a base station, an indicator of a mapping of a set of random access occasions to a set of uplink beams, wherein each uplink beam of the set of uplink beams is paired with a respective downlink beam of a set of downlink beams, and wherein each downlink beam of the set of downlink beams is associated with a respective synchronization signal block resource of a set of synchronization signal block resources; and transmitting, to the base station, a random access preamble over a random access occasion of the set of random access occasions using a first uplink beam of the set of uplink beams associated with the random access occasion based at least in part on the mapping, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam that is used by the base station for receiving the random access preamble, and wherein the second downlink beam is different than the first downlink beam.

Aspect 2: The method of aspect 1, wherein receiving the indicator comprises: receiving an offset of the set of uplink beams associated with the set of random access occasions and relative to the set of downlink beams associated with the set of synchronization signal block resources, wherein a first index associated with the first uplink beam is based at least in part on the random access occasion and the offset, and wherein transmitting the random access preamble using the first uplink beam is based at least in part on receiving the offset.

Aspect 3: The method of any of aspects 1 through 2, wherein receiving the indicator comprises: receiving a set of indices for the set of random access occasions, wherein a first index of the set of indices indicates a correspondence between the random access occasion and the first uplink beam of the set of uplink beams, wherein transmitting the random access preamble using the first uplink beam is based at least in part on receiving the set of indices.

Aspect 4: The method of any of aspects 1 through 3, wherein receiving the indicator comprises: receiving an index that indicates a mapping pattern configured at the UE, wherein the mapping pattern indicates a correspondence between the set of random access occasions and the set of uplink beams, and wherein transmitting the random access preamble using the first uplink beam is based at least in part on receiving the index.

Aspect 5: The method of aspect 4, further comprising: receiving, from the base station, an indication of a set of mapping patterns, wherein each mapping pattern of the set indicates the respective uplink beam for each random access occasion of the set of random access occasions wherein transmitting the random access preamble using the first uplink beam is based at least in part on receiving the indication of the set of mapping patterns.

Aspect 6: The method of any of aspects 1 through 5, further comprising: receiving one or more parameters indicating a set of transmit power offsets for the set of random access occasions, wherein transmitting the random access preamble is based at least in part on a respective transmit power associated with the random access occasion.

Aspect 7: The method of any of aspects 1 through 6, further comprising: receiving, in a full-duplex mode with transmitting the random access preamble using the first uplink beam, a synchronization signal block via the first downlink beam, wherein transmitting the random access preamble over the random access occasion using the first uplink beam is based at least in part on a correspondence between the random access occasion and the first uplink beam.

Aspect 8: The method of aspect 7, further comprising: selecting the random access occasion from the set of random access occasions based at least in part on a reference signal received power associated with the first uplink beam satisfying a threshold.

Aspect 9: The method of any of aspects 1 through 8, wherein. the first uplink beam associated with the random access occasion corresponds to a full-duplex mode of the UE and a second uplink beam associated with a second random access occasion corresponds to a half-duplex mode of the UE, the full-duplex mode is associated with reception of one or more synchronization signal blocks that overlap in time with transmission of the random access preamble, and the random access occasion and the second random access occasion are associated with a same uplink beam based at least in part on the first uplink beam corresponding to the full-duplex mode and the second uplink beam corresponding to the half-duplex mode Aspect 10: The method of any of aspects 1 through 9, wherein the indicator is conveyed via remaining minimum system information signaling.

Aspect 11: The method of any of aspects 1 through 10, wherein the random access occasion at least partially overlaps in time with a respective synchronization signal block associated with the random access occasion for the mapping.

Aspect 12: A method for wireless communication at a base station, comprising: transmitting, to a UE, an indicator of a mapping of a set of random access occasions to a set of uplink beams, wherein each uplink beam of the set of uplink beams is paired with a respective downlink beam of a set of downlink beams, and wherein each downlink beam of the set of downlink beams is associated with a respective synchronization signal block resource of a set of synchronization signal block resources; and receiving, from the UE, a random access preamble over a random access occasion of the set of random access occasions transmitted via a first uplink beam of the set of uplink beams associated with the random access occasion based at least in part on transmitting the indicator of the mapping, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam for receiving the random access preamble by the base station, and wherein the second downlink beam is different than the first uplink beam.

Aspect 13: The method of aspect 12, wherein transmitting the indicator comprises: transmitting an offset of the set of uplink beams associated with the set of random access occasions and relative to the set of downlink beams associated with the set of synchronization signal block resources, wherein a first index associated with the first uplink beam is equal to a second index associated with the random access occasion combined with the offset, and wherein receiving the random access preamble transmitted via the first uplink beam is based at least in part on transmitting the offset.

Aspect 14: The method of any of aspects 12 through 13, wherein transmitting the indicator comprises: transmitting an index for each random access occasion indicating a correspondence between the random access occasion and a respective uplink beam of the set of uplink beams, wherein receiving the random access preamble transmitted via the first uplink beam is based at least in part on transmitting the index for each random access occasion.

Aspect 15: The method of any of aspects 12 through 14, wherein transmitting the indicator comprises: transmitting a set of indices for the set of random access occasions, wherein a first index of the set of indices indicates a correspondence between the random access occasion and the first uplink beam of the set of uplink beams, wherein receiving the random access preamble transmitted via the first uplink beam is based at least in part on transmitting the set of indices.

Aspect 16: The method of aspect 15, further comprising: transmitting, to the UE, an index that indicates a mapping pattern configured at the UE, wherein the mapping pattern indicates a correspondence between the set of random access occasions and the set of uplink beams, and wherein receiving the random access preamble transmitted via the first uplink beam is based at least in part on transmitting the index.

Aspect 17: The method of any of aspects 12 through 16, further comprising: transmitting one or more parameters indicating a set of transmit power offsets for the set of random access occasions, wherein receiving the random access preamble is based at least in part on a respective transmit power associated with the random access occasion.

Aspect 18: The method of any of aspects 12 through 17, further comprising: transmitting, to a second UE, a synchronization signal block over the first synchronization signal block resource, wherein receiving the random access preamble transmitted via the first uplink beam is based at least in part on transmitting the synchronization signal block over the first synchronization signal block resource.

Aspect 19: The method of any of aspects 12 through 18, further comprising: transmitting, to the UE in a full-duplex mode with receiving the random access preamble transmitted via the first uplink beam, a synchronization signal block received via the first downlink beam, wherein receiving the random access preamble over the random access occasion and transmitted via the first uplink beam is based at least in part on a correspondence between the random access occasion and the first uplink beam.

Aspect 20: The method of any of aspects 12 through 19, wherein the first uplink beam of the random access occasion corresponds to a full-duplex mode of the UE and a second uplink beam of a second random access occasion corresponds to a half-duplex mode of the UE, the full-duplex mode is associated with reception of one or more synchronization signal blocks that overlap in time with transmission of the random access preamble, and the random access occasion and the second random access occasion are associated with a same uplink beam based at least in part on the first uplink beam corresponding to the full-duplex mode and the second uplink beam corresponding to the half-duplex mode Aspect 21: The method of any of aspects 12 through 20, wherein the indicator is conveyed via remaining minimum system information signaling.

Aspect 22: The method of any of aspects 12 through 21, wherein the random access occasion at least partially overlaps in time with a respective synchronization signal block associated with the random access occasion in the mapping.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, from a base station, an indicator of a mapping of a set of random access occasions to a set of uplink beams, wherein each uplink beam of the set of uplink beams is paired with a respective downlink beam of a set of downlink beams, and wherein each downlink beam of the set of downlink beams is associated with a respective synchronization signal block resource of a set of synchronization signal block resources; and
      transmit, to the base station, a random access preamble over a random access occasion of the set of random access occasions using a first uplink beam of the set of uplink beams associated with the random access occasion based at least in part on the mapping, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam that is used by the base station for receiving the random access preamble, and wherein the second downlink beam is different than the first downlink beam.

2. The apparatus of claim 1, wherein the instructions to receive the indicator are executable by the processor to cause the apparatus to:
   receive an offset of the set of uplink beams associated with the set of random access occasions and relative to the set of downlink beams associated with the set of synchronization signal block resources, wherein a first index associated with the first uplink beam is based at least in part on the random access occasion and the offset, and wherein transmitting the random access preamble using the first uplink beam is based at least in part on receiving the offset.

3. The apparatus of claim 1, wherein the instructions to receive the indicator are executable by the processor to cause the apparatus to:
receive a set of indices for the set of random access occasions, wherein a first index of the set of indices indicates a correspondence between the random access occasion and the first uplink beam of the set of uplink beams, wherein transmitting the random access preamble using the first uplink beam is based at least in part on receiving the set of indices.

4. The apparatus of claim 1, wherein the instructions to receive the indicator are executable by the processor to cause the apparatus to:
receive an index that indicates a mapping pattern configured at the UE, wherein the mapping pattern indicates a correspondence between the set of random access occasions and the set of uplink beams, and wherein transmitting the random access preamble using the first uplink beam is based at least in part on receiving the index.

5. The apparatus of claim 4, wherein the instructions are further executable by the processor to cause the apparatus to:
receive, from the base station, an indication of a set of mapping patterns, wherein each mapping pattern of the set indicates the respective uplink beam for each random access occasion of the set of random access occasions wherein transmitting the random access preamble using the first uplink beam is based at least in part on receiving the indication of the set of mapping patterns.

6. The apparatus of claim 1, wherein the instructions are further executable by the processor to cause the apparatus to:
receive one or more parameters indicating a set of transmit power offsets for the set of random access occasions, wherein transmitting the random access preamble is based at least in part on a respective transmit power associated with the random access occasion.

7. The apparatus of claim 1, wherein the instructions are further executable by the processor to cause the apparatus to:
receive, in a full-duplex mode with transmitting the random access preamble using the first uplink beam, a synchronization signal block via the first downlink beam, wherein transmitting the random access preamble over the random access occasion using the first uplink beam is based at least in part on a correspondence between the random access occasion and the first uplink beam.

8. The apparatus of claim 7, wherein the instructions are further executable by the processor to cause the apparatus to:
select the random access occasion from the set of random access occasions based at least in part on a reference signal received power associated with the first uplink beam satisfying a threshold.

9. The apparatus of claim 1, wherein:
the first uplink beam associated with the random access occasion corresponds to a full-duplex mode of the UE and a second uplink beam associated with a second random access occasion corresponds to a half-duplex mode of the UE,
the full-duplex mode is associated with reception of one or more synchronization signal blocks that overlap in time with transmission of the random access preamble, and the random access occasion and the second random access occasion are associated with a same uplink beam based at least in part on the first uplink beam corresponding to the full-duplex mode and the second uplink beam corresponding to the half-duplex mode.

10. The apparatus of claim 1, wherein:
the indicator is conveyed via remaining minimum system information signaling.

11. The apparatus of claim 1, wherein the random access occasion at least partially overlaps in time with a respective synchronization signal block associated with the random access occasion for the mapping.

12. An apparatus for wireless communication at a base station, comprising:
a processor;
memory coupled with the processor; and
instructions stored in the memory and executable by the processor to cause the apparatus to:
transmit, to a user equipment (UE), an indicator of a mapping of a set of random access occasions to a set of uplink beams, wherein each uplink beam of the set of uplink beams is paired with a respective downlink beam of a set of downlink beams, and wherein each downlink beam of the set of downlink beams is associated with a respective synchronization signal block resource of a set of synchronization signal block resources; and
receive, from the UE, a random access preamble over a random access occasion of the set of random access occasions transmitted via a first uplink beam of the set of uplink beams associated with the random access occasion based at least in part on transmitting the indicator of the mapping, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam for receiving the random access preamble by the base station, and wherein the second downlink beam is different than the first uplink beam.

13. The apparatus of claim 12, wherein the instructions to transmit the indicator are executable by the processor to cause the apparatus to:
transmit an offset of the set of uplink beams associated with the set of random access occasions and relative to the set of downlink beams associated with the set of synchronization signal block resources, wherein a first index associated with the first uplink beam is equal to a second index associated with the random access occasion combined with the offset, and wherein receiving the random access preamble transmitted via the first uplink beam is based at least in part on transmitting the offset.

14. The apparatus of claim 12, wherein the instructions to transmit the indicator are executable by the processor to cause the apparatus to:
transmit an index for each random access occasion indicating a correspondence between the random access occasion and a respective uplink beam of the set of uplink beams, wherein receiving the random access preamble transmitted via the first uplink beam is based at least in part on transmitting the index for each random access occasion.

15. The apparatus of claim 12, wherein the instructions to transmit the indicator are executable by the processor to cause the apparatus to:
- transmit a set of indices for the set of random access occasions, wherein a first index of the set of indices indicates a correspondence between the random access occasion and the first uplink beam of the set of uplink beams, wherein receiving the random access preamble transmitted via the first uplink beam is based at least in part on transmitting the set of indices.

16. The apparatus of claim 15, wherein the instructions are further executable by the processor to cause the apparatus to:
- transmit, to the UE, an index that indicates a mapping pattern configured at the UE, wherein the mapping pattern indicates a correspondence between the set of random access occasions and the set of uplink beams, and wherein receiving the random access preamble transmitted via the first uplink beam is based at least in part on transmitting the index.

17. The apparatus of claim 12, wherein the instructions are further executable by the processor to cause the apparatus to:
- transmit one or more parameters indicating a set of transmit power offsets for the set of random access occasions, wherein receiving the random access preamble is based at least in part on a respective transmit power associated with the random access occasion.

18. The apparatus of claim 12, wherein the instructions are further executable by the processor to cause the apparatus to:
- transmit, to a second UE, a synchronization signal block over the first synchronization signal block resource, wherein receiving the random access preamble transmitted via the first uplink beam is based at least in part on transmitting the synchronization signal block over the first synchronization signal block resource.

19. The apparatus of claim 12, wherein the instructions are further executable by the processor to cause the apparatus to:
- transmit, to the UE in a full-duplex mode with receiving the random access preamble transmitted via the first uplink beam, a synchronization signal block received via the first downlink beam, wherein receiving the random access preamble over the random access occasion and transmitted via the first uplink beam is based at least in part on a correspondence between the random access occasion and the first uplink beam.

20. The apparatus of claim 12, wherein:
- the first uplink beam of the random access occasion corresponds to a full-duplex mode of the UE and a second uplink beam of a second random access occasion corresponds to a half-duplex mode of the UE,
- the full-duplex mode is associated with reception of one or more synchronization signal blocks that overlap in time with transmission of the random access preamble, and
- the random access occasion and the second random access occasion are associated with a same uplink beam based at least in part on the first uplink beam corresponding to the full-duplex mode and the second uplink beam corresponding to the half-duplex mode.

21. The apparatus of claim 12, wherein:
- the indicator is conveyed via remaining minimum system information signaling.

22. The apparatus of claim 12, wherein the random access occasion at least partially overlaps in time with a respective synchronization signal block associated with the random access occasion in the mapping.

23. A method for wireless communication at a user equipment (UE), comprising:
- receiving, from a base station, an indicator of a mapping of a set of random access occasions to a set of uplink beams, wherein each uplink beam of the set of uplink beams is paired with a respective downlink beam of a set of downlink beams, and wherein each downlink beam of the set of downlink beams is associated with a respective synchronization signal block resource of a set of synchronization signal block resources; and
- transmitting, to the base station, a random access preamble over a random access occasion of the set of random access occasions using a first uplink beam of the set of uplink beams associated with the random access occasion based at least in part on the mapping, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam that is used by the base station for receiving the random access preamble, and wherein the second downlink beam is different than the first downlink beam.

24. The method of claim 23, wherein receiving the indicator comprises:
- receiving an offset of the set of uplink beams associated with the set of random access occasions and relative to the set of downlink beams associated with the set of synchronization signal block resources, wherein a first index associated with the first uplink beam is based at least in part on the random access occasion and the offset, and wherein transmitting the random access preamble using the first uplink beam is based at least in part on receiving the offset.

25. The method of claim 23, wherein receiving the indicator comprises:
- receiving a set of indices for the set of random access occasions, wherein a first index of the set of indices indicates a correspondence between the random access occasion and the first uplink beam of the set of uplink beams, wherein transmitting the random access preamble using the first uplink beam is based at least in part on receiving the set of indices.

26. The method of claim 23, wherein receiving the indicator comprises:
- receiving an index that indicates a mapping pattern configured at the UE, wherein the mapping pattern indicates a correspondence between the set of random access occasions and the set of uplink beams, and wherein transmitting the random access preamble using the first uplink beam is based at least in part on receiving the index.

27. The method of claim 26, further comprising:
- receiving, from the base station, an indication of a set of mapping patterns, wherein each mapping pattern of the set indicates the respective uplink beam for each random access occasion of the set of random access occasions wherein transmitting the random access preamble using the first uplink beam is based at least in part on receiving the indication of the set of mapping patterns.

28. The method of claim 23, further comprising:
receiving one or more parameters indicating a set of transmit power offsets for the set of random access occasions, wherein transmitting the random access preamble is based at least in part on a respective transmit power associated with the random access occasion.

29. The method of claim 23, further comprising:
receiving, in a full-duplex mode with transmitting the random access preamble using the first uplink beam, a synchronization signal block via the first downlink beam,
wherein transmitting the random access preamble over the random access occasion using the first uplink beam is based at least in part on a correspondence between the random access occasion and the first uplink beam.

30. A method for wireless communication at a base station, comprising:
transmitting, to a user equipment (UE), an indicator of a mapping of a set of random access occasions to a set of uplink beams, wherein each uplink beam of the set of uplink beams is paired with a respective downlink beam of a set of downlink beams, and wherein each downlink beam of the set of downlink beams is associated with a respective synchronization signal block resource of a set of synchronization signal block resources; and
receiving, from the UE, a random access preamble over a random access occasion of the set of random access occasions transmitted via a first uplink beam of the set of uplink beams associated with the random access occasion based at least in part on transmitting the indicator of the mapping, wherein the random access occasion overlaps in time with a first synchronization signal block resource, wherein the first synchronization signal block resource is associated with a first downlink beam of the set of downlink beams that is paired with the first uplink beam for the random access occasion, wherein the first uplink beam is associated with a second downlink beam for receiving the random access preamble by the base station, and wherein the second downlink beam is different than the first uplink beam.

* * * * *